(12) United States Patent
Hanada

(10) Patent No.: US 10,254,918 B2
(45) Date of Patent: Apr. 9, 2019

(54) TILT ADJUSTABLE PERSPECTIVE ICONS DISPLAY DEVICE AND NON-TRANSITORY COMPUTER READABLE MEDIUM

(71) Applicant: KYOCERA Document Solutions Inc., Osaka (JP)

(72) Inventor: Naoto Hanada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 242 days.

(21) Appl. No.: 15/244,627

(22) Filed: Aug. 23, 2016

(65) Prior Publication Data

US 2017/0060381 A1 Mar. 2, 2017

(30) Foreign Application Priority Data

Aug. 27, 2015 (JP) .................................. 2015-168300
Aug. 31, 2015 (JP) .................................. 2015-170690
Aug. 31, 2015 (JP) .................................. 2015-170691

(51) Int. Cl.
G06F 9/48 (2006.01)
G06F 3/0481 (2013.01)
(Continued)

(52) U.S. Cl.
CPC .......... *G06F 3/04817* (2013.01); *G06F 3/013* (2013.01); *G06F 3/0482* (2013.01);
(Continued)

(58) Field of Classification Search
CPC .... G06F 3/04817; G06F 3/013; G06F 3/0482; G06F 3/04845; G09G 2320/028;
(Continued)

(56) References Cited

U.S. PATENT DOCUMENTS 5,859,639 A * 1/1999 Ebrahim ............... G06F 3/0481
715/788
8,174,605 B2 5/2012 Yamada
(Continued)

FOREIGN PATENT DOCUMENTS

JP H07-036749 A 2/1995
JP H07-219743 A 8/1995
(Continued)

OTHER PUBLICATIONS

Notice of Reasons for Refusal mailed by Japan Patent Office dated Mar. 20, 2018 in the corresponding Japanese patent application No. 2015-168300.
(Continued)

*Primary Examiner* — Jennifer N To
*Assistant Examiner* — Kc Chen
(74) *Attorney, Agent, or Firm* — IP Business Solutions, LLC

(57) ABSTRACT

A display control section of a display device allows a display section: to display an acceptance screen for accepting an operation of allowing icons contained within an operation screen displayed by the display section to be displayed in a predetermined normal manner or a manner in which the icons are extended in a first direction on the operation screen moving away from a user's line of sight when a tilt of the display surface is changed in one direction; when the acceptance section accepts the operation of allowing the icons to be displayed in the normal manner, to display the operation screen containing the icons displayed in the normal manner, and when the acceptance section accepts the operation of allowing the icons to be displayed in the manner in which the icons are extended, to display the operation screen containing the icons extended at least in the first direction.

18 Claims, 23 Drawing Sheets

(51) Int. Cl.
*G06F 3/0484* (2013.01)
*G06F 3/0482* (2013.01)
*G09G 5/00* (2006.01)
*G06F 3/01* (2006.01)

(52) U.S. Cl.
CPC ........... *G06F 3/04845* (2013.01); *G09G 5/00* (2013.01); *G09G 2320/028* (2013.01); *G09G 2340/0407* (2013.01); *G09G 2340/14* (2013.01); *G09G 2354/00* (2013.01)

(58) Field of Classification Search
CPC ............. G09G 5/00; G09G 2340/0407; G09G 2340/14; G09G 2354/00
See application file for complete search history.

(56) References Cited

U.S. PATENT DOCUMENTS

| | | | | |
|---|---|---|---|---|
| 2008/0189654 A1* | 8/2008 | Thomas | ............ | G06F 17/30867 715/805 |
| 2009/0303373 A1 | 12/2009 | Yamada | | |
| 2010/0131904 A1* | 5/2010 | Fong | ...................... | G06F 3/0346 715/863 |
| 2011/0161884 A1* | 6/2011 | Dugan | .................. | G06F 1/1626 715/843 |
| 2012/0192113 A1* | 7/2012 | Higuchi | .................. | G06F 1/162 715/835 |
| 2013/0111384 A1* | 5/2013 | Kim | ........................ | G06F 3/048 715/765 |
| 2013/0174096 A1* | 7/2013 | Lewin | ................. | G06F 3/04817 715/835 |
| 2014/0300570 A1* | 10/2014 | Matsumoto | ........... | G06F 3/0487 345/173 |
| 2014/0344951 A1* | 11/2014 | Brewer | ................. | G06F 3/0488 726/28 |
| 2016/0044199 A1* | 2/2016 | Nago | ................. | H04N 1/00875 358/1.15 |

FOREIGN PATENT DOCUMENTS

| | | | |
|---|---|---|---|
| JP | 2003-323084 | A | 11/2003 |
| JP | 2007-017598 | A | 1/2007 |
| JP | 2007-328421 | A | 12/2007 |
| JP | 2008-160619 | A | 7/2008 |
| JP | 2009294850 | A | 12/2009 |
| JP | 2010-256460 | A | 11/2010 |
| JP | 2012-108760 | A | 6/2012 |
| JP | 2012108760 | A * | 6/2012 |
| JP | 2012-203537 | A | 10/2012 |
| JP | 2012-203676 | A | 10/2012 |
| JP | 2013-246761 | A | 12/2013 |
| WO | 2013046596 | A1 | 3/2015 |

OTHER PUBLICATIONS

Notice of Reasons for Refusal mailed by Japan Patent Office dated Feb. 20, 2018 in the corresponding Japanese patent application No. 2015-170690.

Notice of Reasons for Refusal mailed by Japan Patent Office dated Feb. 20, 2018 in the corresponding Japanese patent application No. 2015-170691.

* cited by examiner

Fig.11

| ICON NAME | ICON BODY (FULL IMAGE) | ICON BODY (SIMPLIFIED IMAGE) | BACKGROUND PORTION |
|---|---|---|---|
| ICON 1 | DOC | D | xxx1.png |
| ICON 2 | CALC | C | xxx2.png |
| ICON 3 | | | xxx3.png |
| . . . | . . . | . . . | . . . |

40
STORAGE SECTION

Fig.23
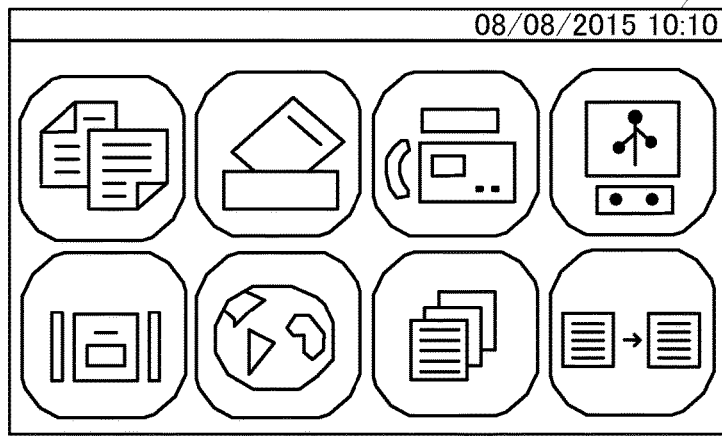
CHANGE OF SHAPE OF ICONS
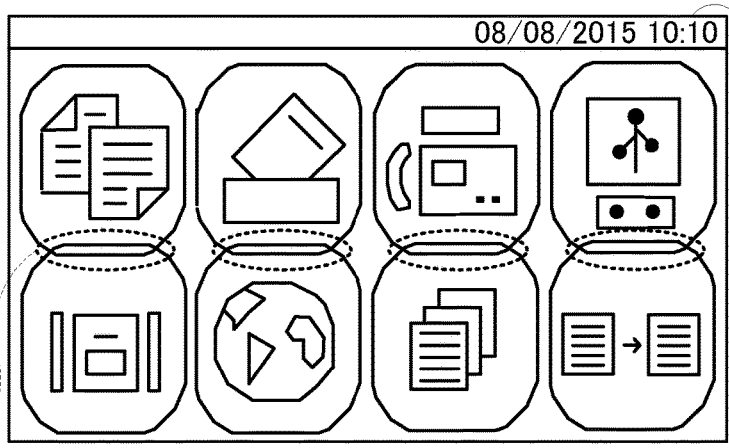
OVERLAP BETWEEN ICONS
CHANGE OF THE NUMBER OF ICONS
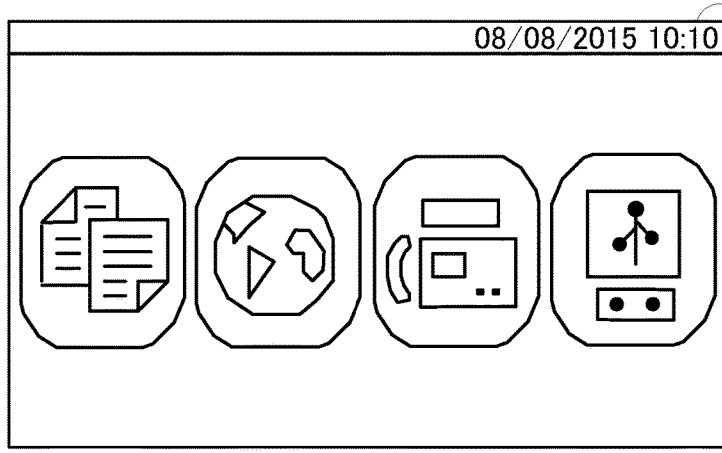

TILT ADJUSTABLE PERSPECTIVE ICONS DISPLAY DEVICE AND NON-TRANSITORY COMPUTER READABLE MEDIUM

INCORPORATION BY REFERENCE

This application claims priority to Japanese Patent Application No. 2015-168300 filed on Aug. 27, 2015, No. 2015-170690 filed on Aug. 31, 2015, and No. 2015-170691 filed on Aug. 31, 2015, the entire disclosures of which are incorporated herein by reference.

BACKGROUND

The present disclosure relates to display devices and computer-readable non-transitory recording media with a display control program recorded thereon and particularly relates to a display device designed so that the tilt of a display surface for displaying an operation screen thereon is variable and a computer-readable non-transitory recording medium on which a display control program for controlling the display device is recorded.

Information processing apparatuses, such as image forming apparatuses and smartphones, are generally equipped with a display device. Approximately square icons associated with various functions are arranged within an operation screen displayed by the display device. A user can select a desired one of the icons within the operation screen to allow the information processing apparatus or the display device to perform a desired function.

SUMMARY

A technique improved over the aforementioned technique is proposed as one aspect of the present disclosure.

A display device according to an aspect of the present disclosure is a display device including: a display section; and a control unit that includes a processor and functions, by information processing of the processor, as an acceptance section accepting an operation performed for a screen displayed by the display section and as a display control section controlling a display operation of the display section, the display section having a display surface variable in tilt.

Furthermore, the display control section allows the display section: (1) to display an acceptance screen for accepting an operation of selecting to allow icons contained within an operation screen displayed by the display section to be displayed in a predetermined normal manner of display or a manner of display in which the icons are extended in a first direction on the operation screen moving away from a user's line of sight when the tilt of the display surface is changed in one direction; (2) when the acceptance section accepts the operation of selecting to allow the icons to be displayed in the normal manner of display, to display the operation screen containing the icons displayed in the normal manner of display; and (3) when the acceptance section accepts the operation of selecting to allow the icons to be displayed in the manner of display in which the icons are extended, to display the operation screen containing the icons extended at least in the first direction.

A computer-readable non-transitory recording medium according to another aspect of the present disclosure contains a display control program recorded thereon, the display control program allowing a computer to function as the above-described display control section and the above-described acceptance section.

BRIEF DESCRIPTION OF THE DRAWINGS

FIG. 11 is a diagram showing an example of data stored in a storage section of the display device according to Supplement 4 of Embodiment 1 of the present disclosure.

FIG. 23 is a view showing contents of image processing performed for an operation screen by a display control section of the display device according to Supplement 1 of Embodiment 5 of the present disclosure.

DETAILED DESCRIPTION

Hereinafter, a description will be given of a display device according to one embodiment of the present disclosure with reference to the drawings.

Embodiment 1

Figure 1:
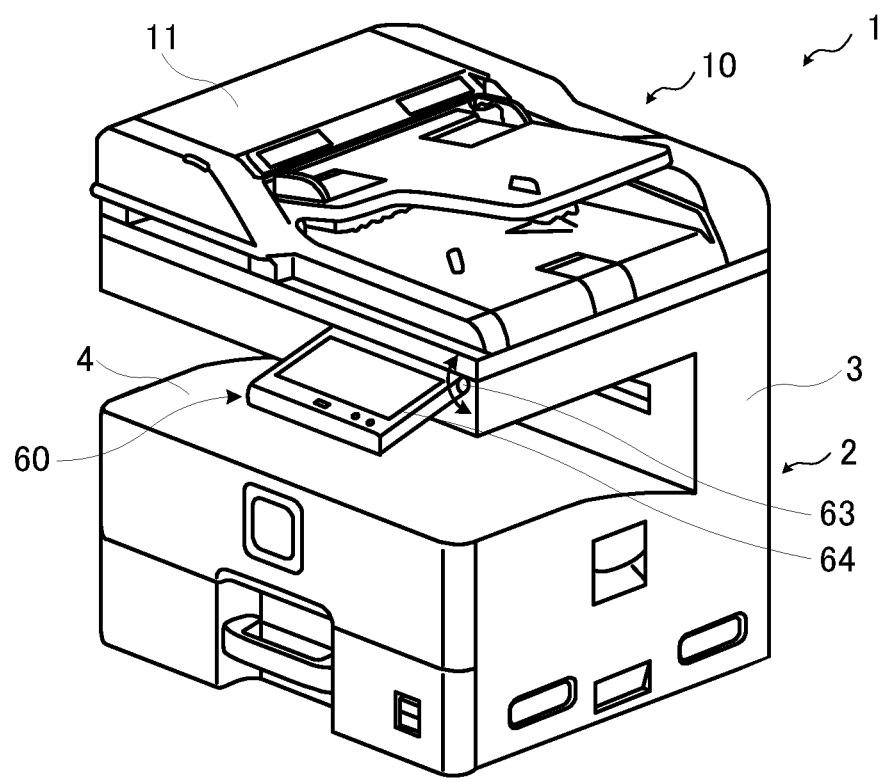
FIG. 1 is a perspective view showing an appearance of an image forming apparatus equipped with a display device according to Embodiment 1 of the present disclosure.
Figure 2:
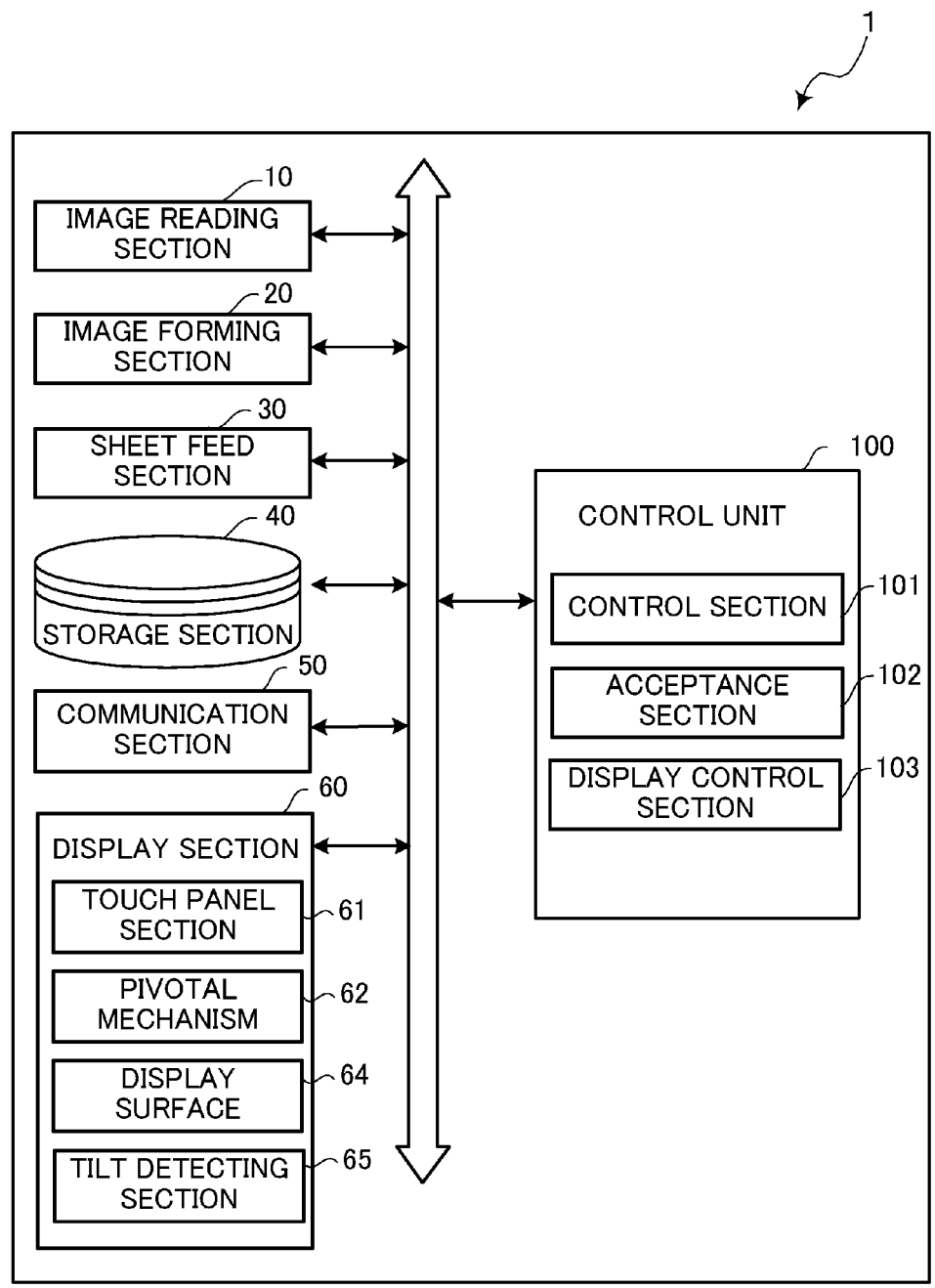
FIG. 2 is a block diagram showing an internal configuration of the image forming apparatus equipped with the display device according to Embodiment 1 of the present disclosure.

FIG. 1 is a perspective view showing an appearance of an image forming apparatus equipped with a display device according to Embodiment 1 of the present disclosure. FIG. 2 is a block diagram showing an internal configuration of the image forming apparatus equipped with the display device according to Embodiment 1 of the present disclosure.

The image forming apparatus 1 is a multifunction peripheral having multiple functions, including a facsimile communication function, a copy function, a print function, and a scan function. As shown in FIG. 1, the image forming apparatus 1 is roughly composed of an apparatus body 2, an image reading section 10 disposed above the apparatus body 2, and a connecting portion 3 provided between the image reading section 10 and the apparatus body 2.

The image reading section 10 is an ADF (auto document feeder) including a document conveyance section 11 and a scanner for optically reading an original document being conveyed by the document conveyance section 11 or an original document placed on an unshown original glass plate.

The apparatus body 2 contains an image forming section 20, a sheet feed section 30, a storage section 40, a communication section 50, and so on.

The image forming section 20 reads image data to be printed and uses the data to form (print) an image on a paper sheet fed from the sheet feed section 30. The paper sheet having an image printed thereon is discharged to a sheet output tray 4.

The storage section 40 is a large storage device, such as an HDD (hard disk drive).

The communication section 50 is a communication interface including an unshown communication module, such as a LAN chip. The image forming apparatus 1 is connected via a network to other PCs (personal computers) to send and receive data to and from the connected PCs through the communication section 50.

A display section 60 is disposed on the front side of the apparatus body 2. The display section 60 is formed to include a liquid crystal display (LCD) or an organic light-emitting diode (OLED) display.

The display section 60 is provided with a touch panel section 61. The touch panel section 61 can detect a user's touch of a display surface 64 of the display section 60 together with the point of touch (a coordinate point). When detecting the user's touch, the touch panel section 61 outputs a detection signal indicating the point of touch to a hereinafter described acceptance section 102 and so on. In this manner, the touch panel section 61 serves as an operation input section where a user's operation is input.

The display section 60 may include, in addition to or in place of the above-described touch panel section 61, physical keys. Examples of the physical keys include arrow keys, a Page Up key, and a Page Down key.

Figure 3:
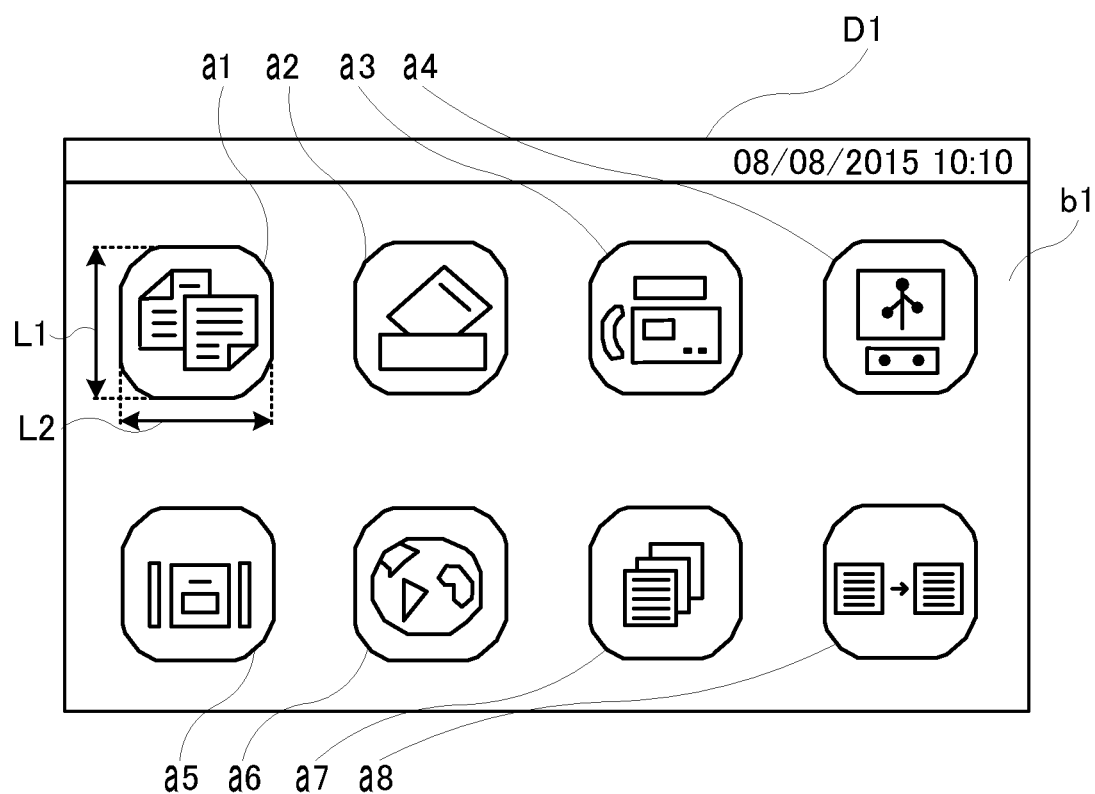
FIG. 3 is a view showing an example of an operation screen displayed on a display surface of the display section of the display device according to Embodiment 1 of the present disclosure.

FIG. 3 is a view showing an example of an operation screen displayed on the display surface 64 of the display section 60. In the example shown in this figure, an operation screen D1 is formed so that a plurality of icons a1 to a8 are arranged on a background screen b1. Each of the icons a1 to a8 has an approximately square shape in which a vertical dimension L1 is equal to a horizontal dimension L2. Furthermore, the icons a1 to a8 are associated with respective functions provided in the image forming apparatus 1 and given graphic images representing their respective functions. For example, the icon a1 is associated with the copy function. When the user inputs an operation of selecting the icon a1 using the touch panel function and the acceptance section 102 accepts the operation of selecting the icon a1, the image forming apparatus 1 performs a copy operation under the control of a control section 101 described hereinafter. In this manner, the user can allow the image forming apparatus 1 to perform a desired function by selecting a desired icon on the operation screen D1.

The display section 60 further includes a pivotal mechanism 62 and a tile detecting section 65. The pivotal mechanism 62 is driven by an unshown motor under the control of the control section 101 to allow the display section 60 to turn about a pivot axis 63 in the direction of the arrow of FIG. 1. Furthermore, the display section 60 is also formed to be pivotally movable about the pivot axis 63, even without being driven by the motor, by a user's manual operation. By the pivotal movement of the display section 60, the tilt of the display surface 64 is changed.

The tilt detecting section 65 is a sensor for detecting the tilt of the display surface 64 and outputs a detection signal indicating the detected tilt to a hereinafter described display control section 103 and so on.

The image forming apparatus 1 further includes a control unit 100. The control unit 100 is formed by including a processor, such as a CPU (central processing unit) or a DSP (digital signal processor), and memories, such as a RAM (random access memory) and a ROM (read only memory). When a control program, such as a display control program, stored in the above ROM or the storage section 40 is executed by the above CPU, the control unit 100 functions as a control section 101, an acceptance section 102, and a display control section 103. Alternatively, each section of the control unit 100 may not be implemented by the operation of the control unit 100 in accordance with the above control program but may be constituted by a hardware circuit.

The control section 101 governs the overall operation control of the image forming apparatus 1. The control section 101 is connected to the image reading section 10, the image forming section 20, the sheet feed section 30, the storage section 40, the communication section 50, the display section 60, and so on and performs the operation control of the above components connected thereto and signal or data transfer to and from the components.

The acceptance section 102 has the function of accepting a user's operation input using the touch panel function on the operation screen D1 or the like displayed by the display section 60.

The display control section 103 has the function of controlling the display operation of the display section 60.

The display device according to the one embodiment of the present disclosure is formed by including, among the above-described components of the image forming apparatus 1, the storage section 40, the display section 60, the control unit 100, and so on.

Next, a description will be given of how the operation screen D1 displayed on the display surface 64 when the display surface 64 is tilted can be seen by the user.

Figure 4:
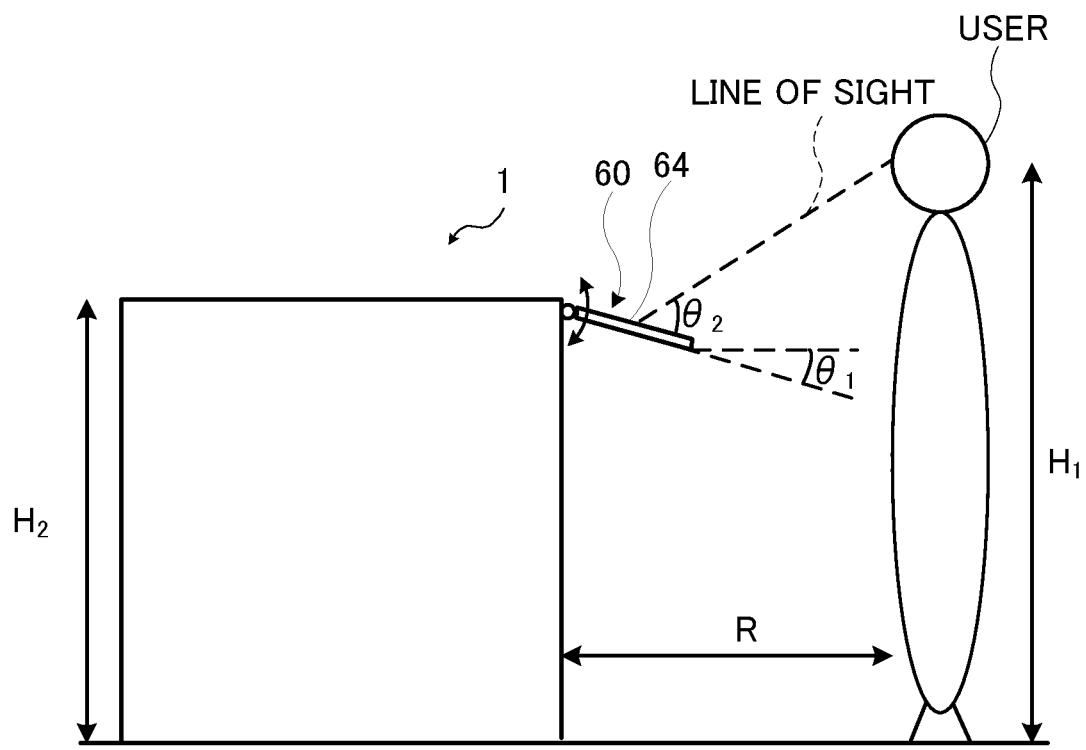
FIG. 4 is a view showing the relationship between the tilt of the display surface and the angle formed by the display surface and a user's line of sight.

FIG. 4 is a view showing the relationship between the tilt of the display surface 64 and the angle formed by the display surface 64 and a user's line of sight. An example shown in FIG. 4 illustrates a state where the display surface 64 is tilted by an angle $\theta_1$ with respect to the horizontal line and the angle at which the display surface 64 and the user's line of sight intersect is an angle $\theta_2$. The angle $\theta_2$ at which the display surface 64 and the user's line of sight intersect is determined by the angle of tilt $\theta_1$ of the display surface 64, the distance R between the image forming apparatus 1 and the user, the height $H_1$ of user's eyes, and the height $H_2$ of the image forming apparatus 1.

Figure 5A:
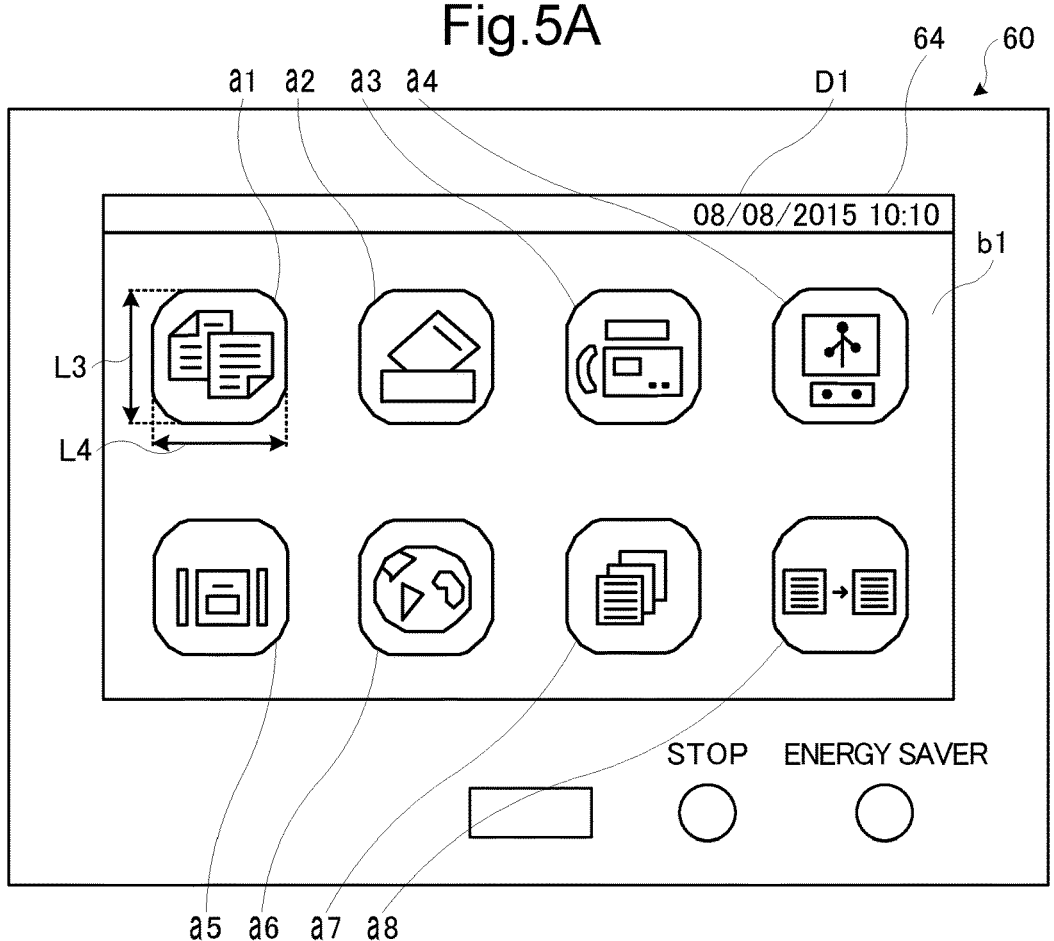
FIG. 5A is a view showing a state of the display surface of the display section of the display device according to Embodiment 1 of the present disclosure when viewed from the front and FIG. 5B is a view showing a state of the display surface of the display section of the display device according to Embodiment 1 of the present disclosure when viewed obliquely.

When the angle $\theta_2$ is 90 degrees, the user views the operation screen D1 displayed on the display surface 64 from the front. In this case, the user sees the display section 60 and operation screen D1 as shown in FIG. 5A. When, as shown in FIG. 5A, the user views the operation screen D1 from the front, the apparent shape of the icons a1 to a8 is apparently approximately square and in this case they maintain approximately square shapes which are their original shapes. For example, the apparent vertical dimension of the icon a1 is L3, the apparent horizontal dimension thereof is L4, and then the vertical dimension L3 is equal to the horizontal dimension L4 (L3=L4).

Figure 5B:
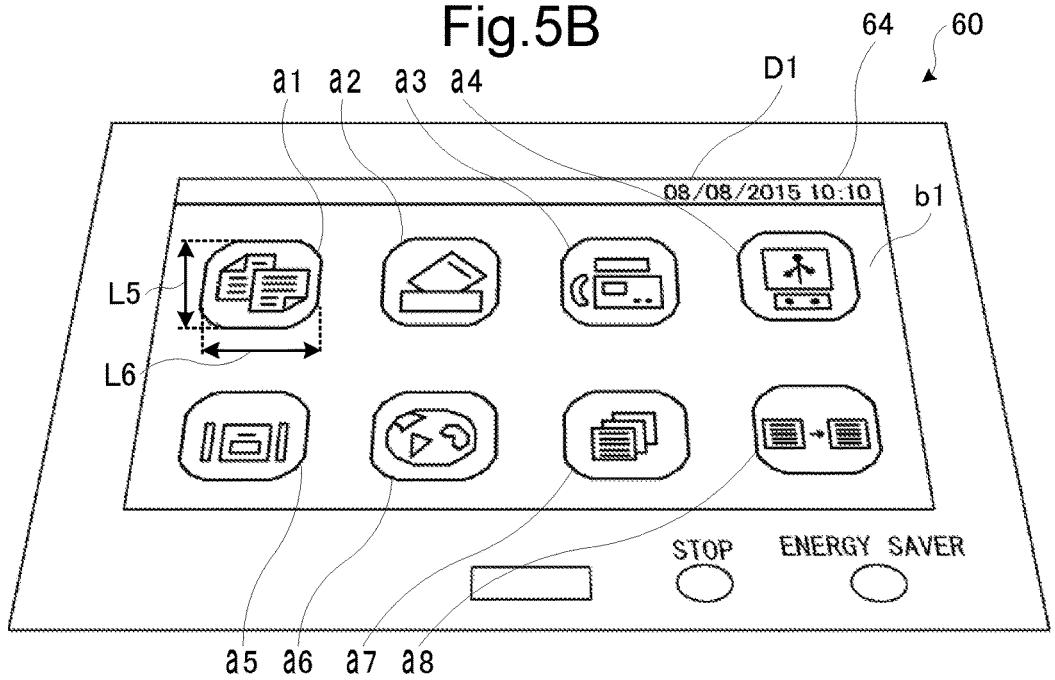

On the other hand, when the angle $\theta_2$ is smaller than 90 degrees, the user obliquely views the operation screen D1 displayed on the display surface 64. In this case, the user sees the display section 60 and operation screen D1 as shown in FIG. 5B. Because the display surface 64 is tilted upward in the plane of the figure, each of the icons a1 to a8 is seen by the user as contracted upward in the plane of the figure as shown in this figure. As a result, the icons a1 to a8 apparently have approximately rectangular shapes in which the vertical dimension is shorter than the horizontal dimension. In other words, the apparent shapes of the icons a1 to a8 get out of approximately square shapes which are their original shapes. For example, the apparent vertical dimension of the icon a1 is L5, the apparent horizontal dimension thereof is L6, and then the longitudinal dimension L5 is shorter than the transverse dimension L6 (L5<L6). When thus the apparent shapes of the icons a1 to a8 get out of approximately square shapes which are their original shapes, the visibility of the icons a1 to a8 decreases.

Mobile terminals, such as smartphones, are usually used as they are held by users' hands. In such a mobile terminal, the tilt of the display surface of the display device varies depending on the orientation of the user's hand. When the tilt of the display surface of the display device varies, the user may obliquely view the operation screen displayed on the display surface. Also in this case, like the above image forming apparatus 1, the icons are seen by the user as getting out of the original shapes (approximately square shapes), which presents a problem of decrease in visibility of the icons.

To solve this problem, the display control section 103 allows the display section 60 to display each of the icons a1 to a8 in a manner of display in which it is extended in a first direction (upward in the plane of the figure). The first direction is a direction on the operation screen moving away from the user's line of sight when the tilt of the display surface 64 is changed in one direction.

The display control section 103 has, as display modes in which the icons a1 to a8 are displayed, two display modes: a normal display mode and a compensating display mode. The normal display mode is a display mode in which the icons a1 to a8 contained within the operation screen D1 are displayed in a normal manner of display. The normal manner of display is a manner of display that allows the display section 60 to display, as images representing the icons a1 to a8, images previously stored in the storage section 40 as they are. In this embodiment, the storage section 40 previously stores approximately square icons a1 to a8 having vertical and horizontal dimensions equal to each other.

On the other hand, the compensating display mode is a display mode in which the icons a1 to a8 stored in the storage section 40 are extended upward in the plane of the figure and the display section 60 is allowed to display the extended icons. In which display mode the display control section 103 should allow the display section 60 to display the icons is selectively determined according to a user's operation input on a predetermined acceptance screen displayed on the display section 60.

Figure 6:
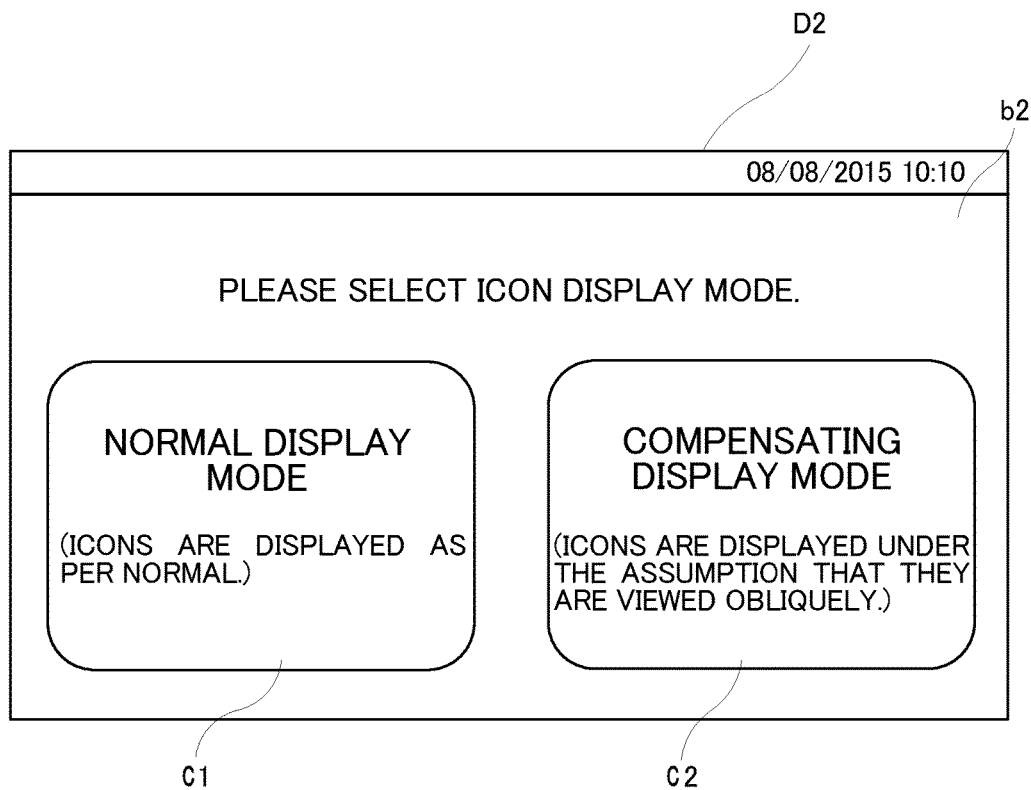
FIG. 6 is a view showing an example of an acceptance screen displayed on the display section of the display device according to Embodiment 1 of the present disclosure.

FIG. 6 is a view showing an example of an acceptance screen displayed on the display section 60. In the example shown in this figure, an acceptance screen D2 contains two buttons c1, c2 arranged on a background screen b2. The button c1 is associated with an instruction to allow the display section 60 to display icons in the normal display mode, while the button c2 is associated with an instruction to allow the display section 60 to display icons in the compensating display mode. When the acceptance section 102 accepts an operation of selecting the button c1, the display control section 103 performs a display control operation in the normal display mode. On the other hand, when the acceptance section 102 accepts an operation of selecting the button c2, the display control section 103 performs a display control operation in the compensating display mode.

In the case where the display control section 103 performs a display control operation in the normal display mode, the previously described operation screen D1 as shown in FIG. 3 is displayed on the display section 60. Then, when the operation screen D1 is viewed obliquely, the operation screen D1 as shown in FIG. 5B is seen by the user.

Figure 7:
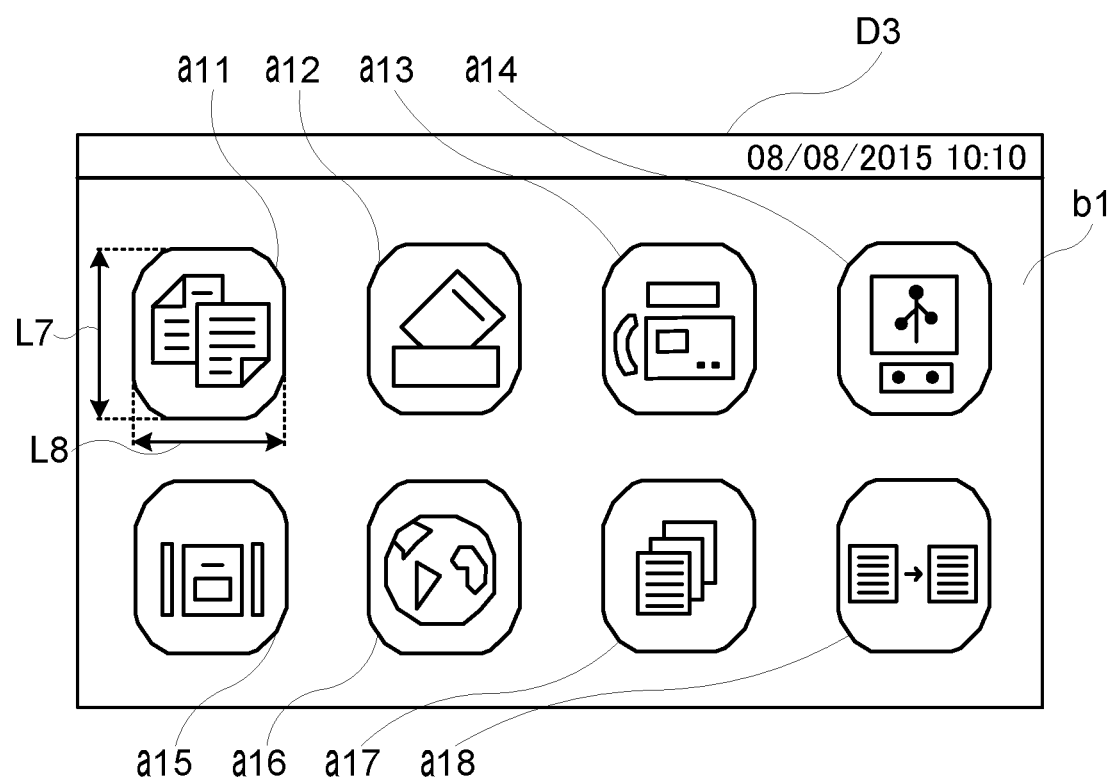
FIG. 7 is a view showing an example of an operation screen displayed on the display surface of the display section of the display device according to Embodiment 1 of the present disclosure, wherein the operation screen contains extended icons.

On the other hand, in the case where the display control section 103 performs a display control operation in the compensating display mode, an operation screen D3 as shown in FIG. 7 is displayed on the display section 60. In this case, the operation screen D3 displayed on the display section 60 is formed so that icons a11 to a18 formed by extending each of the icons a1 to a8 upward in the plane of the figure are arranged on a background screen b1. Since each of the approximately square icons a1 to a8 is extended upward in the plane of the figure, the resultant icons a11 to a18 have an approximately rectangular shape in which the vertical dimension is longer than the horizontal dimension. For example, the icon a11 has a vertical dimension of L7 (L7>L1) and a horizontal dimension of L8 (L8=L2), wherein the vertical diminution L7 is longer than the horizontal dimension L8 (L7>L8).

Figure 8:
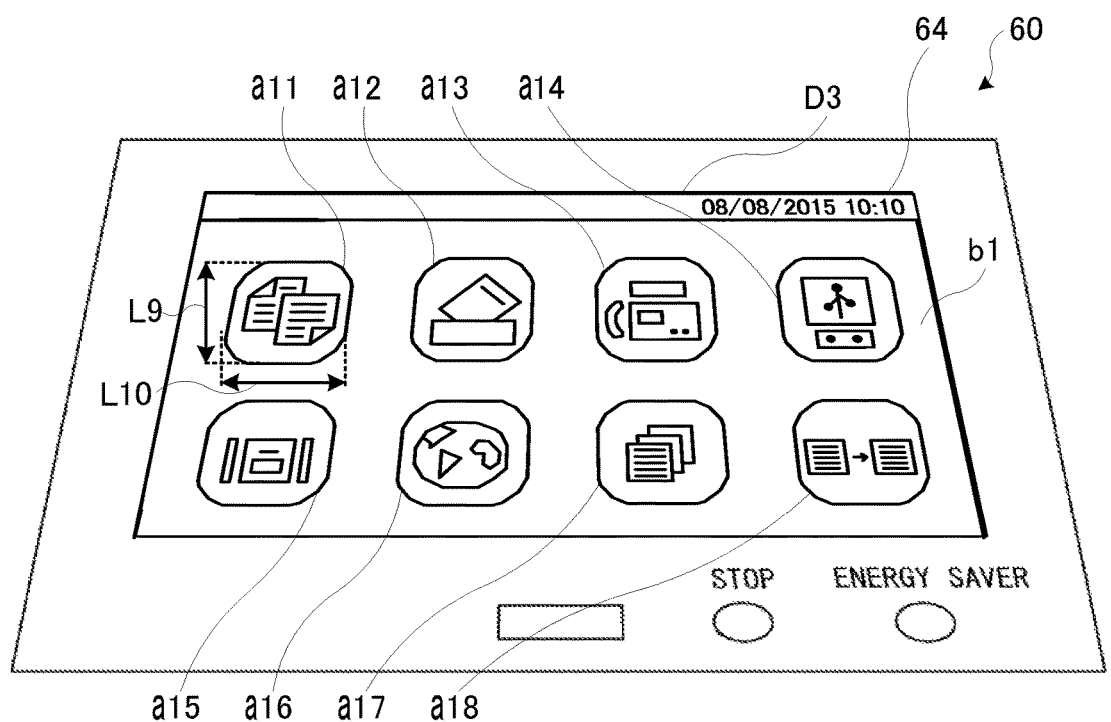
FIG. 8 is a view showing a state of the operation screen displayed on the display surface of the display section of the display device according to Embodiment 1 of the present disclosure when viewed obliquely, wherein the operation screen contains extended icons.

When this operation screen D3 is viewed obliquely, the operation screen D3 as shown in FIG. 8 is seen by the user. Because the display surface 64 is tilted upward in the plane of the figure, each of the icons a11 to a18 is seen by the user as contracted upward in the plane of the figure. As a result, the vertical dimensions of the icons a11 to a18 are apparently reduced. For example, the apparent vertical dimension of the icon a11 is L9 and the apparent horizontal dimension thereof is L10.

Suppose that in both the cases shown in FIGS. 5B and 8 the angles at which the operation screens are viewed are equal. In comparison between the ratio (aspect ratio) of the apparent vertical dimension L5 to the apparent horizontal dimension L6 of the icon a1 and the ratio (aspect ratio) of the apparent vertical dimension L9 to the apparent horizontal dimension L10 of the icon a11, the apparent aspect ratio of the icon a11 is closer to "1". In other words, the apparent shape of the icon a11 is closer to an approximately square shape than the apparent shape of the icon a1.

As seen from the above, the apparent shapes of the icons a11 to a18 are not approximately square shapes but closer to the approximately square shapes as the original shapes than the apparent shapes of the icons a1 to a8. Therefore, even when the user obliquely views the operation screen displayed on the display surface 64 because of the change in tilt of the display surface 64, the visibility of the icons arranged on the operation screen is less likely to decrease.

Figure 9:
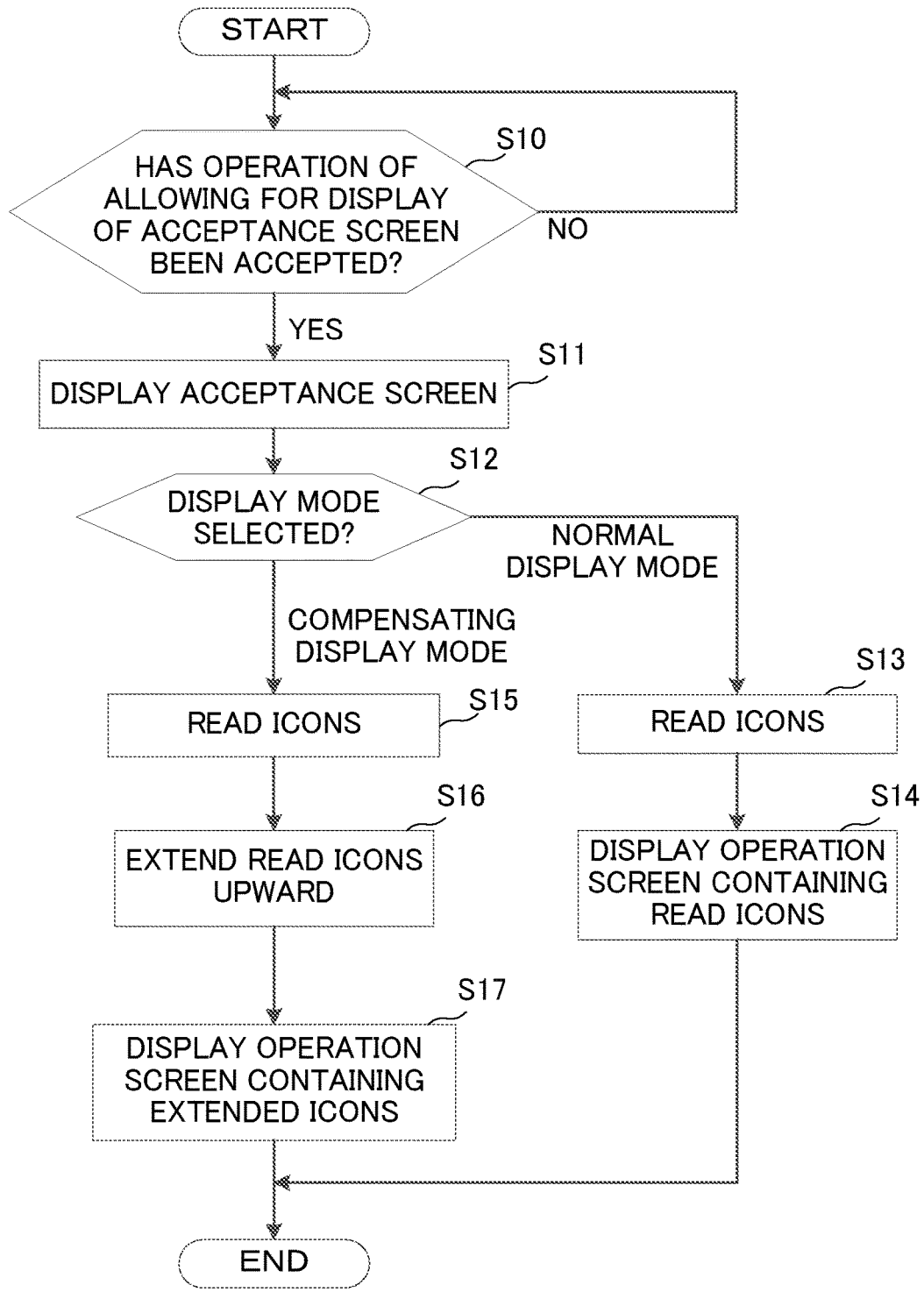
FIG. 9 is a flowchart showing a processing flow of the display device according to Embodiment 1 of the present disclosure.

FIG. 9 is a flowchart showing a processing flow of the display device according to Embodiment 1. As shown in this figure, when the acceptance section 102 accepts an operation of allowing an acceptance screen to be displayed (YES in step S10), the display control section 103 allows the display section 60 to display the acceptance screen D2 shown in FIG. 6 (step S11).

Then, when the acceptance section 102 accepts an operation of selecting the normal display mode on the acceptance screen D2 ("NORMAL DISPLAY MODE" in step S12), the display mode of the display control section 103 is set to the normal display mode.

In the normal display mode, the display control section 103 reads icons stored in the storage section 40 (step S13) and allows the display section 60 to display the operation screen D1 containing the read icons as shown in FIG. 3 (step S14).

On the other hand, when the acceptance section 102 accepts an operation of selecting the compensating display mode on the acceptance screen D2 ("COMPENSATING DISPLAY MODE" in step S12), the display mode of the display control section 103 is set to the compensating display mode.

In the compensating display mode, the display control section 103 reads icons stored in the storage section 40 (step S15) and performs processing for extending the read icons upward (step S16). Then, the display control section 103 allows the display section 60 to display the operation screen D3 containing the extended icons generated in the processing of step S16, as shown in FIG. 7 (step S17).

As thus far described, in the display device according to Embodiment 1, when it is expected that the user is likely to obliquely view the operation screen, the button c2 is selected on the acceptance screen D2 shown in FIG. 6, thus allowing icons to be displayed based on considerations of the icons being viewed obliquely, which reduces the decrease in visibility of the icons. On the other hand, when it is expected that the user is less likely to obliquely view the operation screen, the button c1 is selected on the acceptance screen D2 shown in FIG. 6, thus allowing icons to be displayed not based on considerations of the icons being viewed obliquely but in the normal manner of display, which enables the icons to be viewed with high visibility.

<Supplement 1>

The display control section 103 may not only extend each of the icons a1 to a8 upward in the plane of the figure but also border each of the extended icons a11 to a18 by a different color (for example, white) from a color constituting the peripheral region of the icon a11 to a18.

Figure 10:
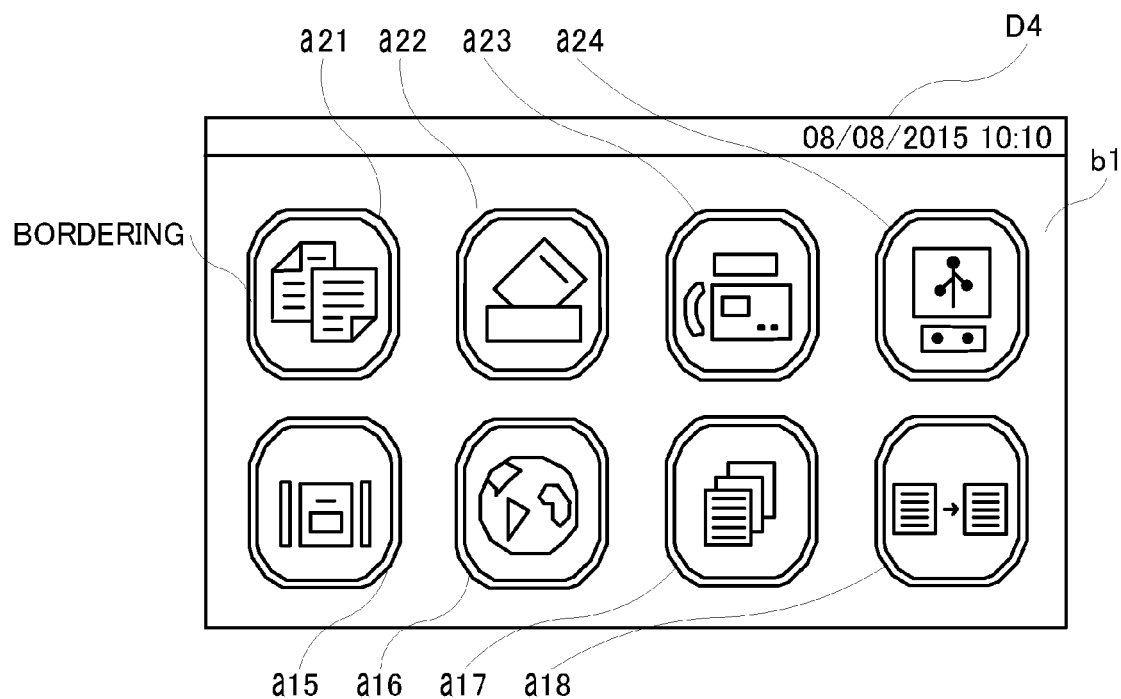
FIG. 10 is a view showing an example of an operation screen displayed on the display section of the display device according to Supplement 1 of Embodiment 1 of the present disclosure.

FIG. 10 is a view showing an example of an operation screen displayed on the display section 60 of the display device according to Supplement 1. In the example shown in this figure, an operation screen D4 is formed so that icons a21 to a28 formed by bordering the extended icons a11 to a18 are arranged on a background screen b1.

By doing so, the visibility of the icons can be enhanced and the decrease in visibility of the icons due to oblique viewing of the operation screen can be further reduced.

<Supplement 2>

The display control section 103 may not only extend each of the icons a1 to a8 upward in the plane of the figure but also make the display density of the extended icons a11 to a18 higher than in the normal manner of display. To do this, the display control section 103 performs processing for increasing the display density of icons read from the storage section 40.

By doing so, the visibility of the icons can be enhanced and the decrease in visibility of the icons due to oblique viewing of the operation screen can be further reduced.

<Supplement 3>

As shown in FIG. 3, each of the icons a1 to a8 arranged within the operation screen D1 is composed of an icon body which is a graphic image representing an associated function and a background portion. The display control section 103 generates each of the extended icons a11 to a18 shown in FIG. 7 by extending the icon body and the background portion. In the above embodiment, the display control section 103 generates each extended icon by extending the icon body and the background portion at equal rate. Unlike this, the display control section 103 in Supplement 3 generates the extended icon by extending the icon body and the background portion at different rates so that the rate of extension of the icon body is greater than the rate of extension of the background portion.

In each extended icon generated in the above manner, its non-graphic background portion has a smaller dimension along the vertical direction in the plane of the figure than that of the extended icon generated in Embodiment 1 described above. As seen from this, in the display control section 103 in Supplement 3, only the icon body on which the user focuses can be extended to a great degree without the need to extend the entire icon to a great degree. In other words, without the need to extend the entire shape of the icon to a great degree, the apparent shape of the icon body focused on by the user when the icon is viewed obliquely can be brought close to the original shape.

<Supplement 4>

FIG. 11 is a diagram showing an example of data about icons stored in the storage section 40. As shown in this figure, the storage section 40 stores, for each icon, a graphic image representing the icon body and an image representing the background portion. Furthermore, the storage section 40 stores, as graphic images representing the icon body of each icon, a full image (the first image) and a simplified image (the second image). The simplified image is, as shown in FIG. 11, an image in which the visibility of the icon body is enhanced by omitting part of the full image.

When the acceptance section 102 accepts an operation of selecting to allow icons to be displayed in the normal manner of display, the display control section 103 in Supplement 4 reads, from the storage section 40, full images as images representing the icon bodies. Then, the display control section 103 allows the display section 60 to display an operation screen containing icons in which the read full images are shown. On the other hand, when the acceptance section 102 accepts an operation of selecting to allow icons to be displayed in a manner of display in which the icons are extended, the display control section 103 reads, from the storage section 40, simplified images as images representing the icon bodies. Then, the display control section 103 extends the icons containing the read simplified images upward in the plane of the figure and allows the display section 60 to display an operation screen containing the extended icons.

Since in extending the icons, instead of using full images as images representing the icon bodies, simplified images enhanced in visibility by partly omitting the full images are used as described above, the decrease in visibility of the icons due to oblique viewing of the operation screen can be further reduced.

Embodiment 2

A display device according to Embodiment 2 is different from the display device according to Embodiment 1 in that the display control section 103 changes the dimension by which each icon contained within the operation screen is extended according to the tilt of the display surface 64 detected by a tilt detecting section 65.

Figure 12:
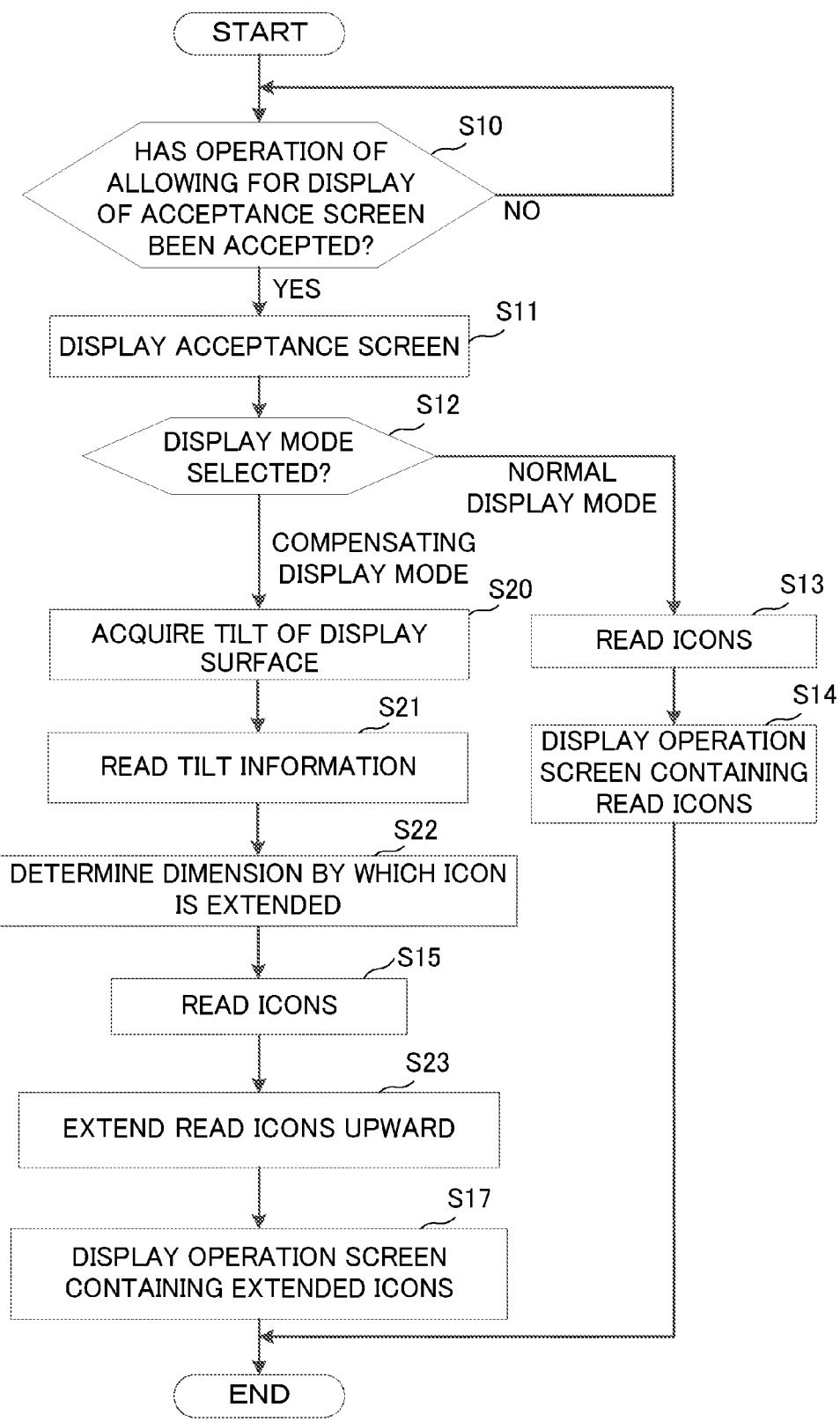
FIG. 12 is a flowchart showing a processing flow of a display device according to Embodiment 2 of the present disclosure.

FIG. 12 is a flowchart showing a processing flow of the display device according to Embodiment 2. The same pieces of processing as those in the flowchart of FIG. 9 are designated by the same references and further explanation thereof will be omitted.

In the compensating display mode of the display device according to Embodiment 2, the display control section 103 acquires the tilt of the display surface 64 from a detection signal output by the tilt detecting section 65 (step S20).

Then, the display control section 103 reads from the storage section 40 tilt information stored in the storage section 40 (step S21). The tilt information is information indicating the tilt of the display surface 64 of the display section 60 when the display surface 64 is orthogonal to the user's line of sight in a usual way of using the image forming apparatus 1 or the display device.

After the processing of step S21, the display control section 103 determines the dimension by which each icon contained within the operation screen is extended (step S22). Specifically, as the difference between the tilt indicated by the tilt information read in the processing of step S21 and the tilt of the display surface 64 acquired in the processing of step S20 increases, i.e., as the tilt of the display surface 64 departs from the tilt indicated by the tilt information, the display control section 103 increases the dimension by which each of the icons is extended.

Then, the display control section 103 reads icons stored in the storage section 40 (step S15) and performs processing for extending the read icons by the dimension determined in the processing of step S22 (step S23).

As seen from the above, in the display device according to Embodiment 2, the dimension by which each icon contained within the operation screen is extended is changed according to the angle at which the user views the operation screen. Therefore, the decrease in visibility of the icons due to oblique viewing of the operation screen can be further reduced.

<Supplement 1>

In Supplement 1 of Embodiment 1, a description has been given of the case where the display control section 103 not only extends each of the icons a1 to a8 upward in the plane of the figure but also borders each of the extended icons a11 to a18 by a different color (for example, white) from a color constituting the peripheral region of the icon a11 to a18.

Unlike the above, in Supplement 1 of Embodiment 2, the display control section 103 changes the border size of the icons and/or the border color of the icons according to the tilt of the display surface 64 detected by the tilt detecting section 65. Specifically, as the tilt of the display surface 64 departs from the tilt indicated by the tilt information, the display control section 103 increases the border size of the icons. Additionally or alternatively, as the tilt of the display surface 64 departs from the tilt indicated by the tilt information, the display control section 103 changes the border color of the icons to a color (for example, red) more conspicuous to the user.

<Supplement 2>

In Supplement 2 of Embodiment 1, a description has been given of the case where the display control section 103 not only extends each of the icons a1 to a8 upward in the plane of the figure but also makes the display density of the extended icons a11 to a18 higher than in the normal manner of display.

Unlike the above, in Supplement 2 of Embodiment 2, the display control section 103 may change the degree of increase in the display density of the icons according to the tilt of the display surface 64 detected by the tilt detecting section 65. Specifically, as the tilt of the display surface 64 departs from the tilt indicated by the tilt information, the display control section 103 increases the degree of increase in the display density of the icons.

Embodiment 3

In a display device according to Embodiment 3, the display control section 103 extends icons contained within the operation screen not only in the first direction but also in a second direction orthogonal to the first direction. Furthermore, the display control section 103 increases the dimension of extension in the second direction with distance in the first direction.

Figure 13:
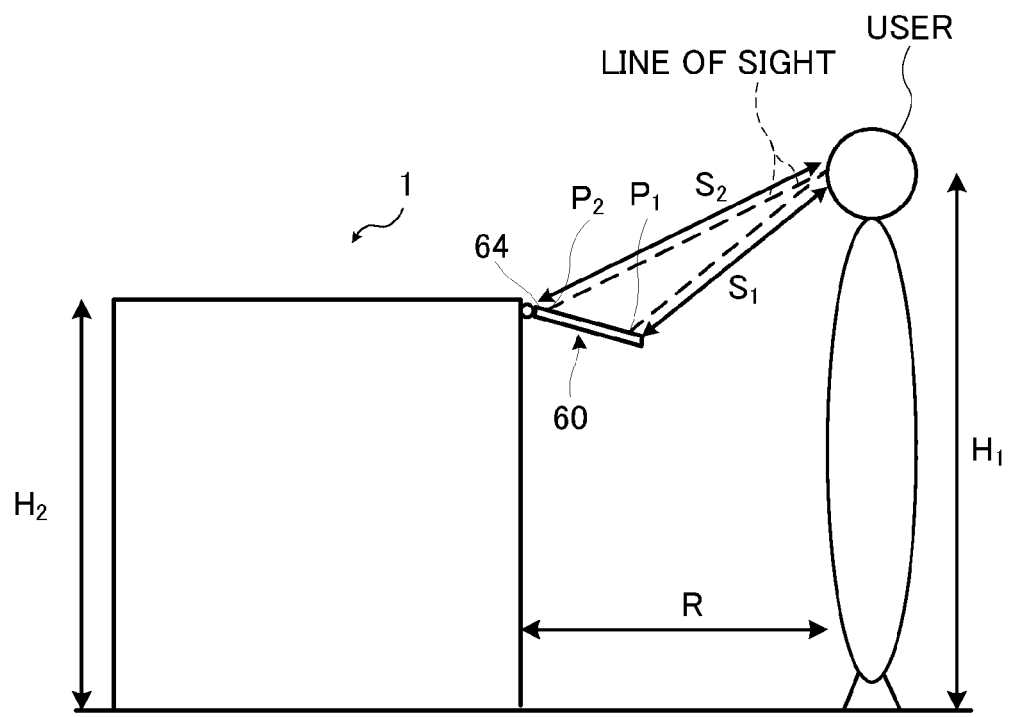
FIG. 13 is a view showing the distance between user's eyes and the display surface.

FIG. 13 is a view showing the distance between user's eyes and the display surface 64. As shown in this figure, the distance between user's eyes and the display surface 64 varies depending on the point on the display surface 64. For example, the distance $S_2$ between an upper point $P_2$ on the display surface 64 and user's eyes is longer than the distance $S_1$ between a lower point $P_1$ on the display surface 64 and the user's eyes. When the user obliquely views the display surface 64 as shown in FIG. 13, the difference between the distance $S_2$ and the distance $S_1$ is larger than when viewing the display surface 64 from the front. In other words, when the display surface 64 is viewed obliquely, the range of variation in the above distance depending on the point on the display surface 64 is large.

Figure 14:
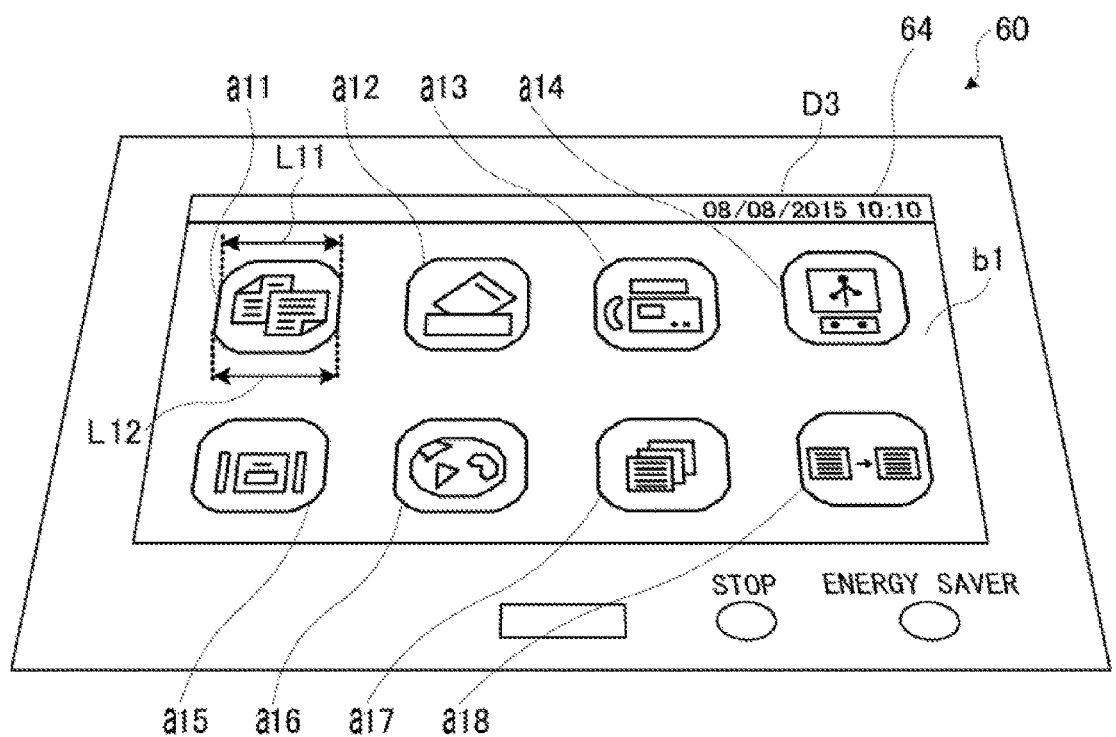
FIG. 14 is a view showing a state of an operation screen of the display device according to Embodiment 1 of the present disclosure when viewed obliquely, wherein the operation screen contains extended icons.

FIG. 14 is a view showing a state of an operation screen of the display device according to Embodiment 1 when viewed obliquely, wherein the operation screen contains extended icons. As the distance between the user's eyes and the display surface 64 increases, the icons contained within the operation screen are seen smaller.

In this case, the apparent length L11 of the upper side of the icon a11 is shorter than the apparent length L12 of the lower side of the icon a11. The reason for this is that the distance between the upper side of the icon a11 and the user's eyes is longer than the distance between the lower side of the icon a11 and the user's eyes. As a result, the icon a11 has an apparently trapezoidal shape. Likewise, the other icons a12 to a18 have apparently trapezoidal shapes. Since thus the icons a11 to a18 arranged within the operation screen D3 have different shapes from approximately square shapes which are their original shapes, the visibility of the icons a11 to a18 decreases.

Figure 15:
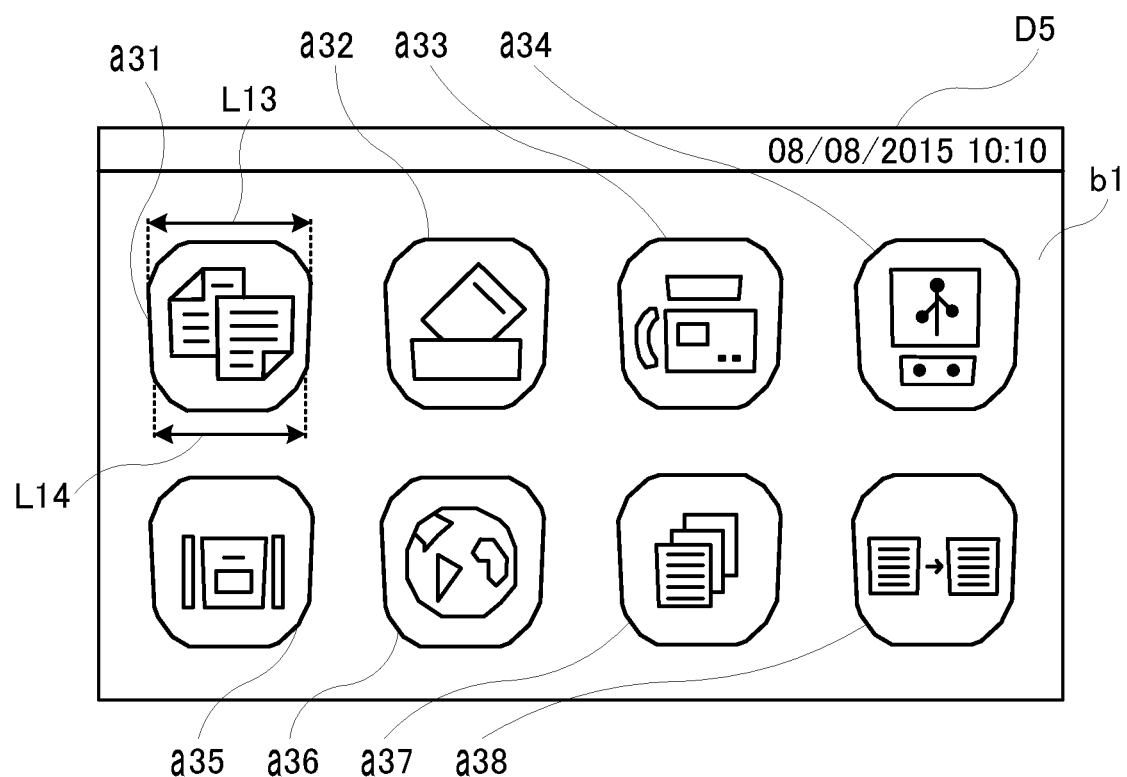
FIG. 15 is a view showing an example of an operation screen displayed on a display section of a display device according to Embodiment 3 of the present disclosure.

To solve the above problem, in the display device according to Embodiment 3, the display control section 103 extends each of the icons a1 to a8 not only in the first direction (upward in the plane of the figure) but also in a second direction (laterally in the plane of the figure) orthogonal to the first direction. Furthermore, the display control section 103 increases the dimension by which each of the icons is extended in the second direction with distance in the first direction (upward in the plane of the figure). FIG. 15 is a view showing an example of an operation screen displayed on the display section 60 by the display control section 103. The example shown in this figure illustrates an operation screen D5 in which extended icons a31 to a38 obtained so that the extended icons a11 to a18 extended upward in the plane of the figure as shown in FIG. 7 and so on are further extended laterally in the plane of the figure are arranged on a background screen b1.

As a result of extending each of the icons a11 to a18 of approximately rectangular shape having a longer vertical dimension than a horizontal dimension laterally in the plane of the figure, each of resultant icons a31 to a38 has an inverted trapezoidal shape of which the upper base is longer than the lower base. For example, the icon a31 has an upper base length of L13 and a lower base length of L14, wherein the upper base length L13 is longer than the lower base length L14 (L13>L14).

By extending the icons in the above manner, the apparent shapes of the icons contained within the operation screen can be brought close to the original shapes (approximately square shapes) even when the user obliquely views the operation screen.

<Supplement>

The display control section 103 may change the dimension by which each of the icons is extended laterally in the plane of the figure according to the tilt of the display surface 64 detected by the tilt detecting section 65. Specifically, as the tilt of the display surface 64 departs from the tilt indicated by the tilt information, the display control section 103 increases the dimension by which each of the icons is extended laterally in the plane of the figure.

As seen from the above, in the display device according to the supplement of Embodiment 3, the dimension by which each icon contained within the operation screen is extended laterally in the plane of the figure is changed according to the angle at which the user views the operation screen. Therefore, it is less likely that the apparent shapes of the icons deform from approximately square shapes as their original shapes to trapezoidal shapes owing to oblique viewing of the operation screen.

Embodiment 4

In the display devices according to Embodiments 1 to 3, the icons contained within the operation screen are changed in shape (extended), thus reducing the decrease in visibility of the icons due to user's oblique viewing of the operation screen. Unlike the above, in a display device according to Embodiment 4, the whole of the operation screen is changed in shape, thus reducing the decrease in visibility of the operation screen due to user's oblique viewing of the operation screen.

Figure 16:
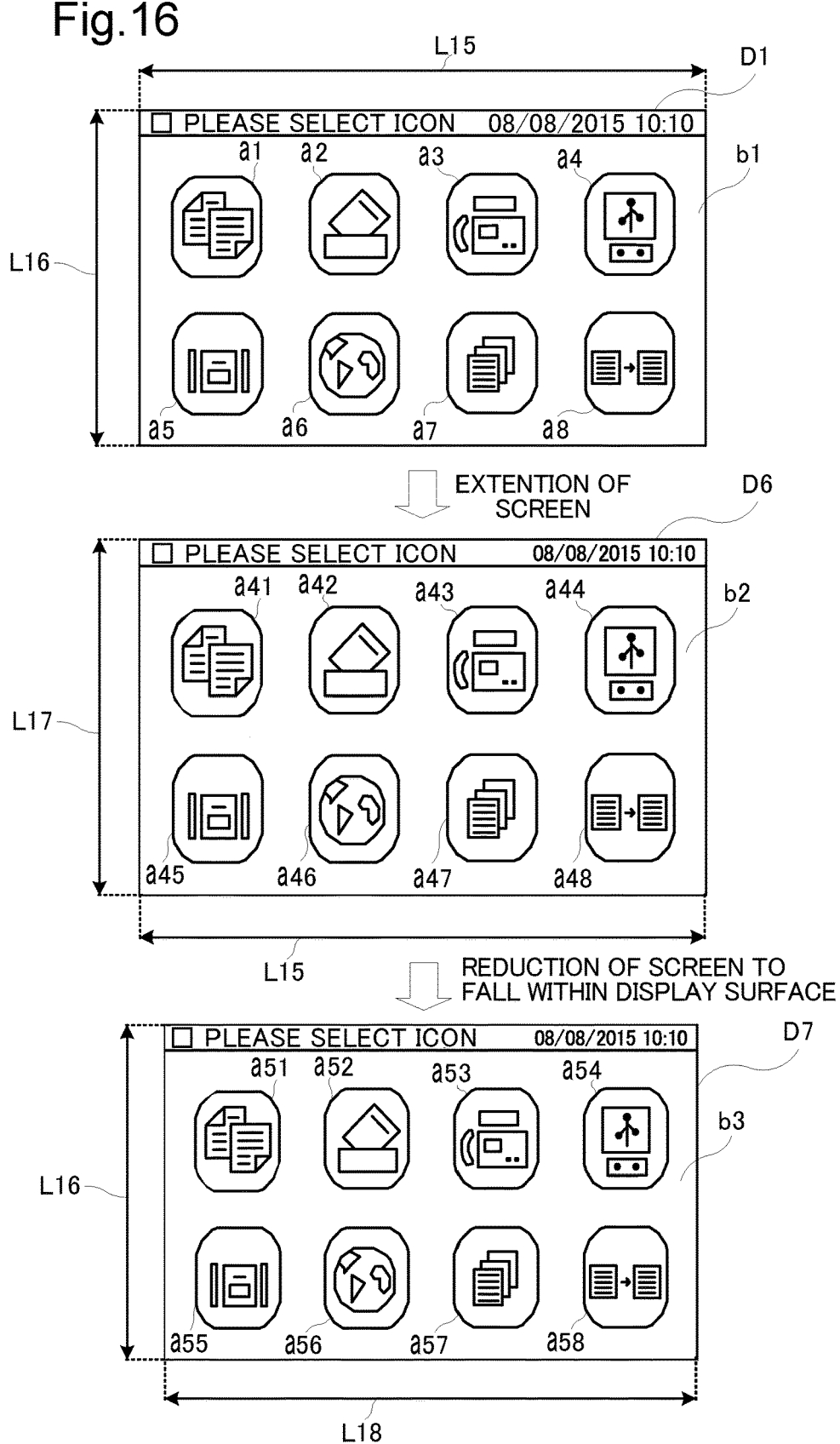
FIG. 16 is a view showing details of image processing performed for an operation screen by a display control section in a display device according to Embodiment 4 of the present disclosure.

FIG. 16 is a view showing details of image processing performed for an operation screen by the display control section 103 in a display device according to Embodiment 4. As shown in this figure, the display control section 103 extends the operation screen D1 in the first direction (upward in the plane of the figure). Thus, the operation screen D1 having a horizontal dimension of L15 and a vertical dimension of L16 is changed to an operation screen D6 having a horizontal dimension of L15 and a vertical dimension of L17 (L17>L16). Furthermore, with this extension of the operation screen, the icons a1 to a8 of approximately square shape are extended to icons a41 to a48 of approximately rectangular shape, respectively, and the background screen b1 is also extended to a background screen b2.

Figure 17:
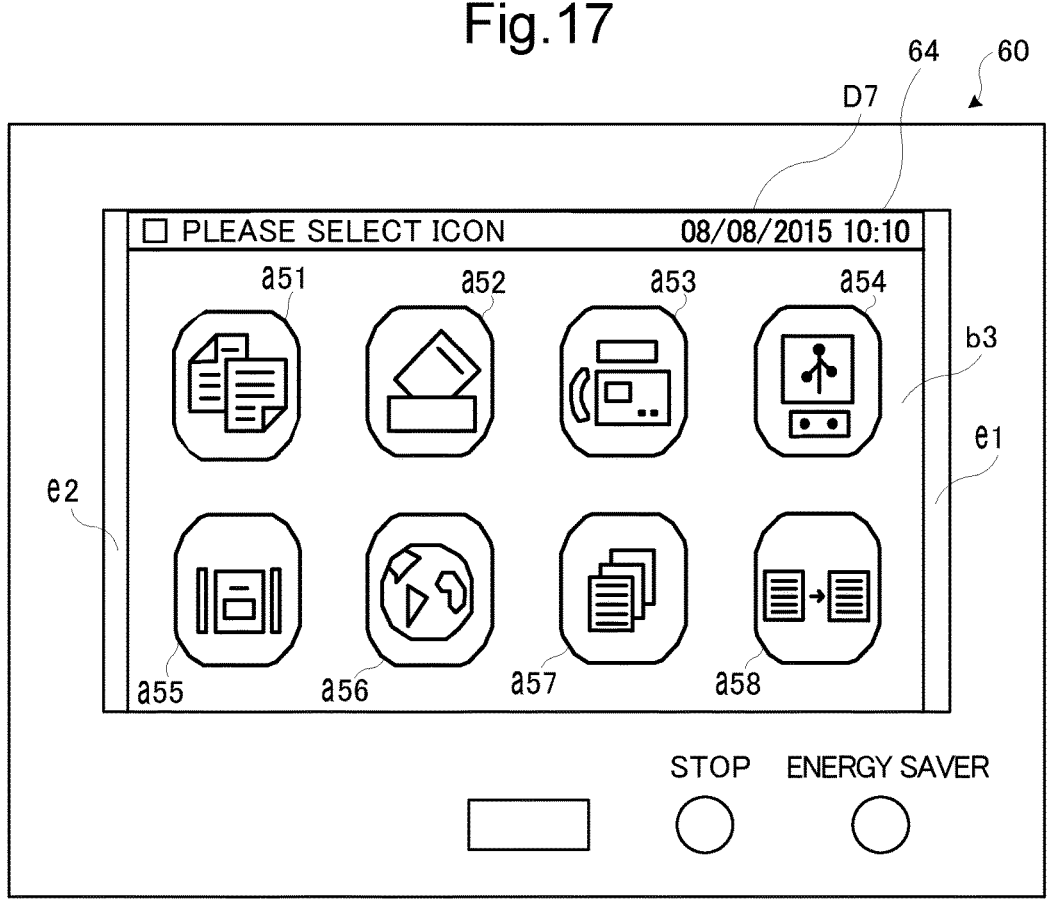
FIG. 17 is a view showing an example of the operation screen displayed on a display section of the display device according to Embodiment 4 of the present disclosure.

As a result of the above extension of the operation screen, the extended operation screen D6 does not fall within the display surface 64 of the display section 60. Therefore, the display control section 103 performs image processing for reducing the extended operation screen D6 while keeping its aspect ratio so that the extended operation screen D6 falls within the display surface 64 of the display section 60 (see FIG. 16). Thus, the operation screen D6 having a horizontal dimension of L15 and a vertical dimension of L17 is changed to an operation screen D7 having a horizontal dimension of L18 (L18<L15) and a vertical dimension of L16. Furthermore, with this reduction of the operation screen, the icons a41 to a48 are scaled down to icons a51 to a58, respectively, and the background screen b2 is also scaled down to a background screen b3. After subjecting the operation screen to the above image processing, the display control section 103 allows the display section 60 to display the operation screen resulting from the image processing, as shown in FIG. 17.

Figure 18:
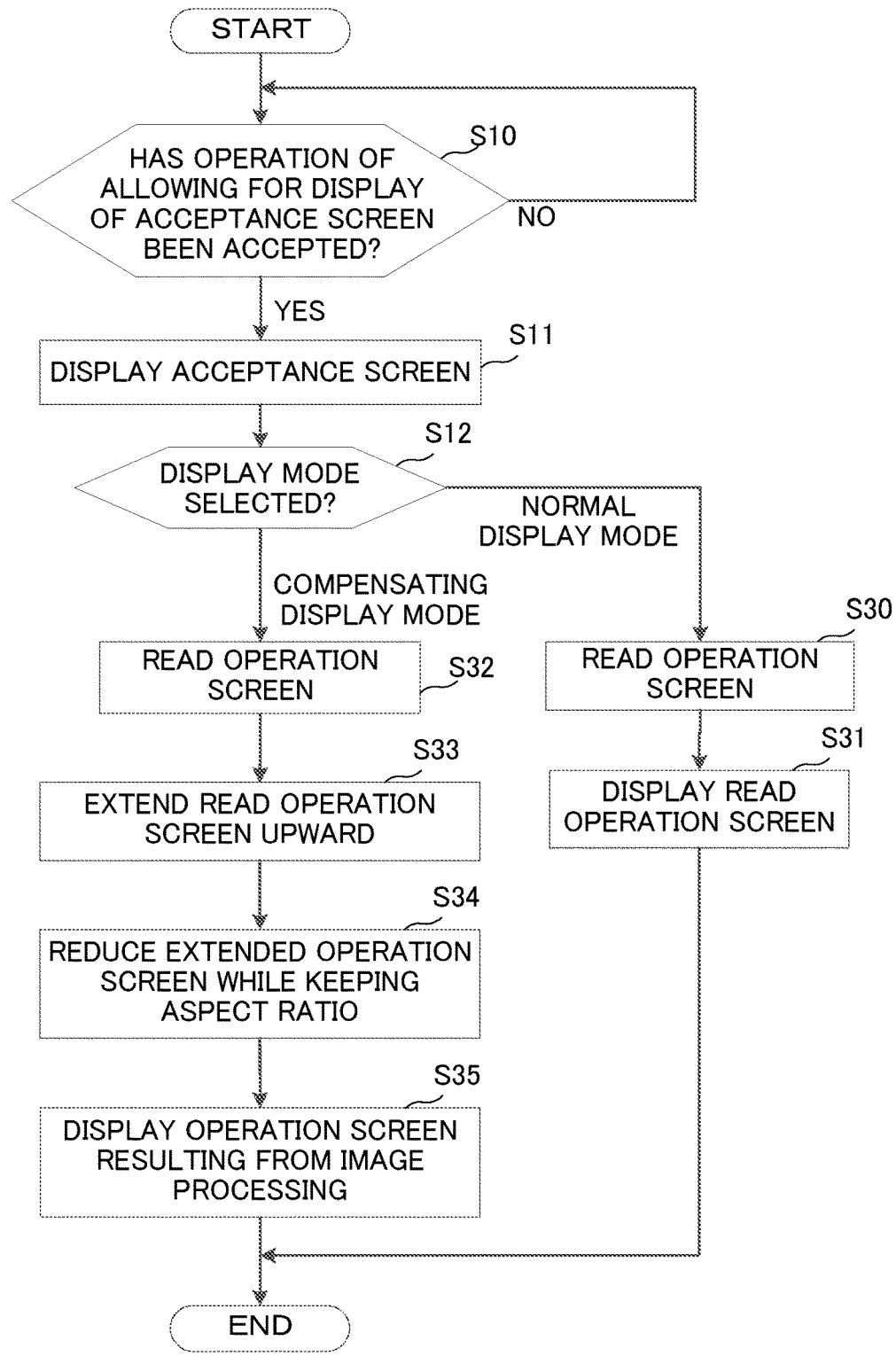
FIG. 18 is a flowchart showing a processing flow of the display device according to Embodiment 4 of the present disclosure.

FIG. 18 is a flowchart showing a processing flow of the display device according to Embodiment 4. The same pieces of processing as those in the flowchart of FIG. 9 are designated by the same references and further explanation thereof will be omitted.

In the normal display mode of the display device according to Embodiment 4, the display control section 103 reads an operation screen stored in the storage section 40 (step S30) and allows the display section 60 to display the read operation screen (step S31).

On the other hand, in the compensating display mode, the display control section 103 reads an operation screen stored in the storage section 40 (step S32), performs processing for extending the read operation screen upward (step S33), and performs image processing for reducing the extended operation screen (step S34). Thereafter, the display control section 103 allows the display section 60 to display an operation screen resulting from the image processing (step S35).

Otherwise, when the user obliquely views an operation screen, not only icons but also characters and other images contained within the operation screen depart from their original aspect ratios, so that the visibility of the operation screen decreases. In this respect, in the display device according to Embodiment 4, even when the user obliquely views the operation screen, the apparent aspect ratios of characters and other images contained within the operation screen can be brought close to their original aspect ratios by the above extension of the whole of the operation screen. Therefore, the decrease in visibility of the operation screen due to user's oblique viewing of the operation screen can be reduced.

When the display section 60 displays the extended operation screen D7, both lateral end portions of the display surface 64 provide blank areas e1 and e2 where the operation screen D7 is not displayed, as shown in FIG. 17. The display control section 103 complements the blank areas e1 and e2 with the same color as the color constituting the background screen b3 of the operation screen D7. Thus, it is possible to make the blank areas caused by changing the shape of the operation screen less noticeable.

<Supplement 1>

The display control section 103 may change the dimension by which the operation screen is extended upward in the plane of the figure according to the tilt of the display surface 64 detected by the tilt detecting section 65. Specifically, as the tilt of the display surface 64 departs from the tilt indicated by the tilt information, the display control section 103 increases the dimension by which the operation screen is extended upward in the plane of the figure. Thus, the decrease in visibility of the icons due to oblique viewing of the operation screen can be further reduced.

<Supplement 2>

In the display device according to Supplement 2 of Embodiment 4, the display control section 103 extends the operation screen not only in the first direction (upward) but also in the second direction (laterally) orthogonal to the first direction. Furthermore, the display control section 103 increases the dimension of extension in the direction orthogonal to the first direction with distance in the first direction. After this extension processing, the display control section 103 performs image processing for reducing the extended operation screen while keeping its aspect ratio so that the extended operation screen falls within the display surface 64 of the display section 60.

Figure 19:
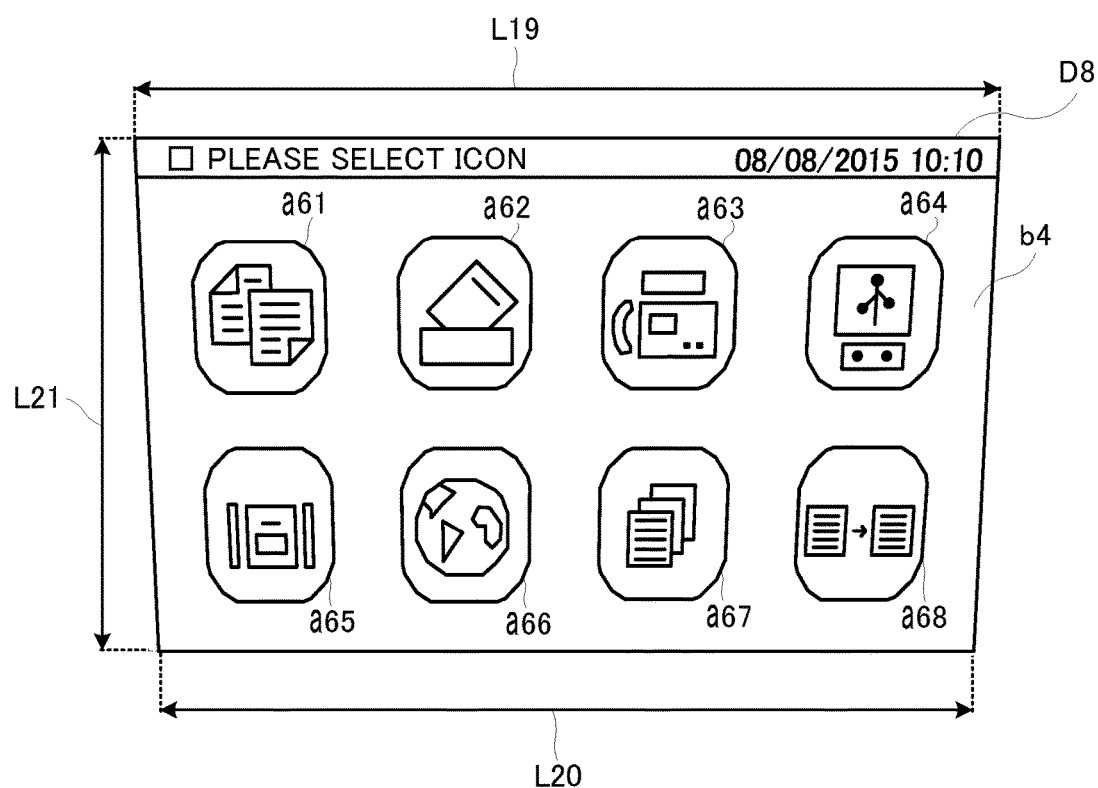
FIG. 19 is a view showing an example of an operation screen displayed on the display section of the display device according to Supplement 2 of Embodiment 4 of the present disclosure.

FIG. 19 is a view showing an example of an operation screen displayed on the display section 60 of the display device according to Supplement 2 of Embodiment 4. As shown in this figure, a resultant operation screen D6 has an inverted trapezoidal shape having a vertical dimension of L21, an upper base length of L19, and a lower base length of L20, wherein the upper base length L19 is longer than the lower base length L20 (L19>L20).

By the extension of the operation screen in the above manner, when the user obliquely views the operation screen, the apparent aspect ratios of characters and other images contained within the operation screen can be brought closer to their original aspect ratios. Therefore, the decrease in visibility of the operation screen due to user's oblique viewing of the operation screen can be further reduced.

The display control section 103 may change the dimension by which the operation screen is extended laterally in the plane of the figure according to the tilt of the display surface 64 detected by the tilt detecting section 65. Specifically, as the tilt of the display surface 64 departs from the tilt indicated by the tilt information, the display control section 103 increases the dimension by which the operation screen is extended laterally in the plane of the figure.

<Supplement 3>

Like Supplement 1 of Embodiment 1, the display control section 103 may border each of the icons contained within the operation screen by a different color (for example, white) from a color constituting the peripheral region of the icon. Thus, the visibility of the icons, which are to be particularly noticed within the operation screen, can be enhanced and the decrease in visibility of the icons due to oblique viewing of the operation screen can be further reduced.

Furthermore, the display control section 103 may change the border size of the icons and/or the border color of the icons according to the tilt of the display surface 64 detected by the tilt detecting section 65.

<Supplement 4>

Like Supplement 2 of Embodiment 1, the display control section 103 may make the display density of the icons contained within the operation screen higher than in the normal manner of display. Thus, the visibility of the icons, which are to be particularly noticed within the operation screen, can be enhanced and the decrease in visibility of the icons due to oblique viewing of the operation screen can be further reduced. Furthermore, the display control section 103 may change the degree of increase in the display density of the icons according to the tilt of the display surface 64 detected by the tilt detecting section 65.

Embodiment 5

Figure 20:
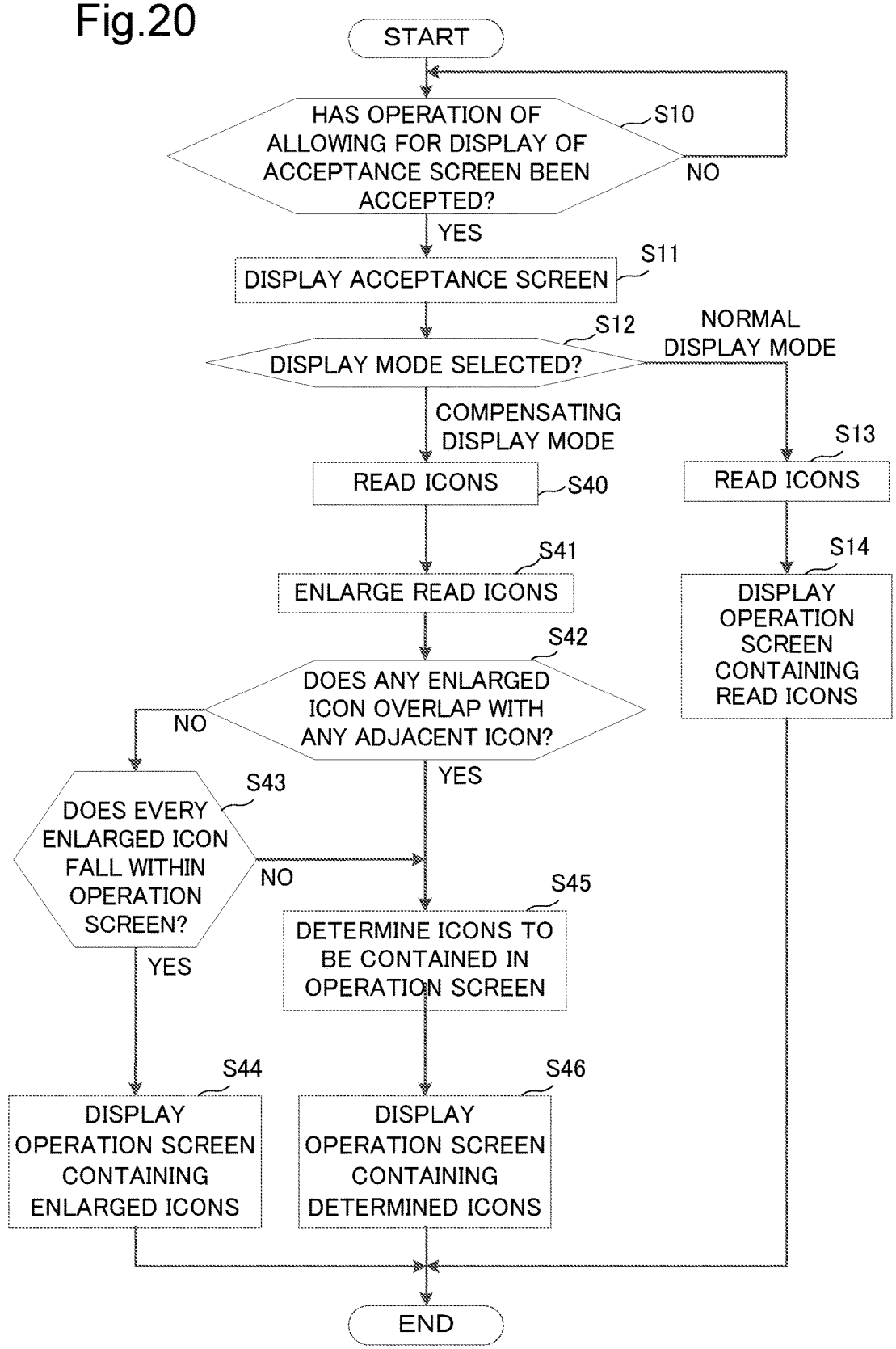
FIG. 20 is a flowchart showing a processing flow of a display device according to Embodiment 5 of the present disclosure.

FIG. 20 is a flowchart showing a processing flow of a display device according to Embodiment 5. The same pieces of processing as those in the flowchart of FIG. 9 are designated by the same references and further explanation thereof will be omitted.

In the compensating display mode, the display control section 103 reads icons stored in the storage section 40 (step S40) and performs processing for enlarging the read icons (step S41). Specifically, the display control section 103 scales up the read icons while keeping their aspect ratio. This processing for enlarging the icons is performed for the purpose of enhancing the visibility of the icons.

After enlarging the icons, the display control section 103 determines whether or not any of the enlarged icons overlaps with any of the other icons adjacent thereto within the operation screen (step S42). Furthermore, the display control section 103 determines whether or not every enlarged icon falls within the operation screen (step S43). If any enlarged icon does not overlap with any adjacent icon (NO in step S42) and every enlarge icon falls within the operation screen (YES in step S43), the display control section 103 allows the display section 60 to display the operation screen containing the enlarged icons (step S44).

On the other hand, if any of the enlarged icons overlaps with any of the adjacent icons (YES in step S42) or if any of the enlarged icons falls outside the operation screen (NO in step S43), the display control section 103 performs processing for determining, among the enlarged icons, those to be contained within the operation screen (step S45).

Figure 21:
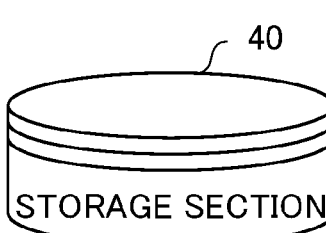
FIG. 21 is a diagram showing degrees of priority stored in a storage section of the display device according to Embodiment 5 of the present disclosure.

In this respect, the display control section 103 first determines a specific number of enlarged icons that can fall within the operation screen without overlapping with any adjacent icons. Then, the display control section 103 determines the icons to be contained within the operation screen, based on degrees of priority stored in the storage section 40. FIG. 21 is a diagram showing the degrees of priority stored in the storage section 40. As shown in this figure, the storage section 40 stores a degree of priority for each icon contained within the operation screen. The display control section 103 arranges the enlarged icons, in decreasing order of priority, within the operation screen. In doing so, the display control section determines the icons to be contained within the operation screen by arranging the icons within the operation screen until the operation screen no longer has any space to arrange the icons without overlapping with the other icons. Thus, the display control section 103 can allow the display section 60 to display an operation screen in which the number of icons contained within the operation screen is reduced to at least the specific number described above.

Figure 22:
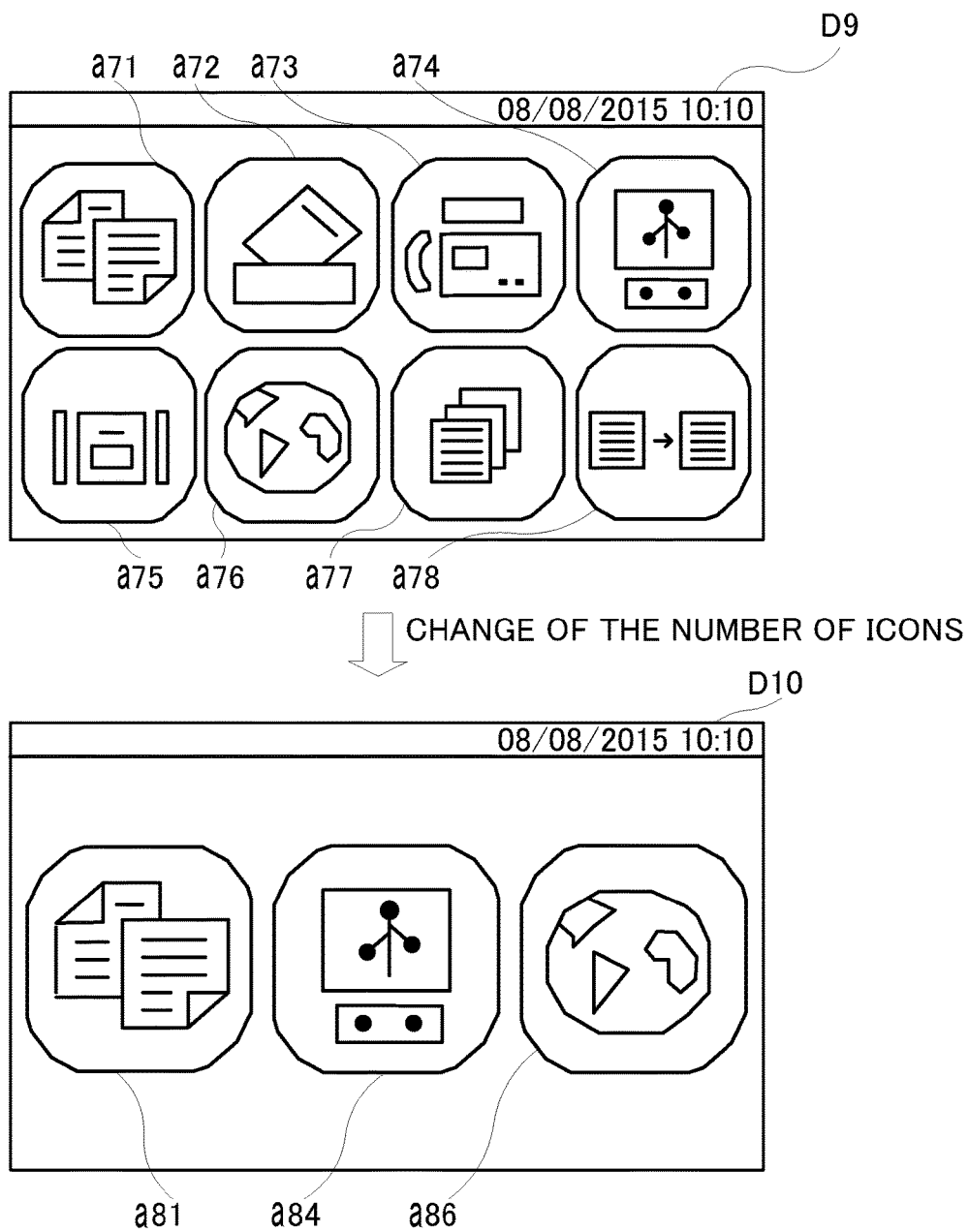
FIG. 22 is a view showing details of image processing performed for an operation screen by a display control section of the display device according to Embodiment 5 of the present disclosure.

FIG. 22 is a view showing details of the processing performed by the display control section 103. When, as shown in the upper half of FIG. 22, each of eight icons a71 to a78 arranged within the operation screen D9 is enlarged, the operation screen cannot contain all of the enlarged icons. In this case, the display control section 103 allows, among the eight icons, only three icons a81, a84, a86 having the highest degree of priority stored in the storage section 40 to be contained within an operation screen D10, as shown in the lower half of FIG. 22.

As seen from the above, by enlarging the icons contained within the operation screen, the display device according to Embodiment 5 can enhance the visibility of the icons and reduce the decrease in visibility of the icons due to user's oblique viewing of the operation screen. Furthermore, situations that may be caused by enlarging the icons, i.e., overlapping of enlarged icons with adjacent other icons and falling of enlarged icons outside the operation screen, can be avoided.

<Supplement>

The description in Embodiment 5 has been given of the case where the display control section 103 enlarges icons contained within the operation screen keeping their aspect ratios. However, the present disclosure is not always limited to this case. As shown in FIG. 23, if the extension of icons contained within an operation screen D11 in the first direction (upward in the plane of the figure) like Embodiment 1 provides overlaps between adjacent icons in an operation screen D12, the display control section 103 may allow the display section 60 to display an operation screen D13 in which the number of icons contained therein is reduced.

Furthermore, like Embodiment 3, the display control section 103 may extend the icons contained within the operation screen not only in the first direction but also in the second direction orthogonal to the first direction. Moreover, like Embodiment 2, the display control section 103 may change the dimension by which each of the icons is extended according to the tilt of the display surface 64 detected by the tilt detecting section 65.

The present disclosure is not limited to the configurations of the above embodiments and can be modified in various ways.

<Modification 1>

Although in each of the above embodiments the description has been given of the case where the display device according to each embodiment is a display panel provided in an image forming apparatus, the present disclosure is not always limited to this case. The display device according to each embodiment is also applicable to a display device provided in a mobile terminal, such as a smartphone, or a display device provided in a PC (personal computer), a television set or the like.

For example, if the display device according to each embodiment is applied to a mobile terminal, the direction of user's gaze may be detected by a gaze detecting section, such as a camera, provided in the mobile terminal. In this case, the control section 101 (angle calculating section) uses the direction detected by the gaze detecting section and the tilt detected by the tilt detecting section 65 described in the above embodiments to calculate the angle at which the user's line of sight and the display surface 64 of the display section 60 intersect. As the angle calculated by the control section 101 departs from 90 degrees, the display control section 103 increases the dimension by which each icon contained within the operation screen is extended. Thus, without using the tilt information stored in the storage section 40, the dimension by which each icon contained within the operation screen is extended can be changed according to the angle at which the user views the operation screen.

<Modification 2>

Although in each of the above embodiments the description has been given of the case where icons contained within the operation screen have an approximately square shape, the present disclosure is not always limited to this case. No particular limitation is placed on the shape of the icons contained within the operation screen. For example, the icons may have an approximately circular shape.

<Other Modifications>

The display control program described in the above embodiments may be one recorded on a computer-readable non-transitory recording medium, such as a hard disk, a CD-ROM, a DVD-ROM or a semiconductor memory. In this case, the computer-readable non-transitory recording medium with the control program recorded thereon is one embodiment of the present disclosure.

Furthermore, the above embodiments and modifications may be implemented in any combination.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display device comprising:
   a display section that includes a display and a touch panel, the display section being de-signed so that a tilt of a display surface of the display is variable;
   a storage section that previously stores a plurality of images each representing each of a plurality of icons of a same shape in which a ratio between a length in a predetermined first direction and a length in a second direction orthogonal to the first direction on the display surface of the display is predetermined; and
   a control unit that includes a processor and functions, when the processor executes a display control program, as an acceptance section accepting an instruction to be input through the touch panel, and as a display control section controlling a display operation of the display, the display control section allowing the display:
   (1) when the acceptance section accepts through the touch panel an instruction to display an acceptance screen for accepting an instruction of selecting to allow the plurality of icons to be displayed in a normal display manner or a different display manner different from the normal display manner, to display the acceptance screen;
   (2) when the acceptance section accepts through the touch panel the instruction of selecting to allow the plurality of icons to be displayed in the normal display manner, to display, by using the plurality of images previously stored in the storage section, the plurality of icons whose lengths in the first direction and whose lengths in the second direction are not changed; and
   (3) when the acceptance section accepts through the touch panel the instruction of selecting to allow the plurality of icons to be displayed in the different display manner, to display, by using the plurality of images previously stored in the storage section, the plurality of icons of the same shape whose lengths in the first direction are extended equally and whose lengths in the second direction are extended equally such that a degree of the extension increases as distance from one end of the display surface in the first direction decreases;

(4) when the acceptance section accepts through the touch panel the instruction of selecting to allow the plurality of icons to be displayed in the different display manner, the display control section additionally makes a display density of the plurality of icons higher than a display density of the plurality of icons represented by the plurality of images previously stored in the storage section.

2. The display device according to claim 1, wherein when the acceptance section accepts through the touch panel the instruction of selecting to allow the plurality of icons to be displayed in the different display manner, the display control section additionally borders each of the plurality of icons by a different color from a color constituting a peripheral region of the plurality of icons.

3. The display device according to claim 1, further comprising a tilt detecting section capable of detecting the tilt of the display surface, wherein as a difference between an angle of the tilt detected by the tilt detecting section and a predetermined angle increases, the display control section increases a dimension of the plurality of icons by which each of the plurality of icons is extended in the first direction.

4. The display device according to claim 3, wherein the display control section increases the dimension by which each of the plurality of icons is extended in the second direction as the difference between the angle of tilt detected by the tilt detecting section and the predetermined angle increases.

5. The display device according to claim 3, wherein the display control section additionally makes a display density of the plurality of icons higher than a display density of the plurality of icons represented by the plurality of images previously stored in the storage section and increases a degree of increase in the display density of the plurality of icons as the difference between the angle of tilt detected by the tilt detecting section and the predetermined angle increases.

6. The display device according to claim 3, wherein the display control section additionally borders each of the plurality of icons by a different color from a color constituting a peripheral region of the plurality of icons and gradually increases a border size of the plurality of icons or changes a border color of the plurality of icons as the difference between the angle of tilt detected by the tilt detecting section and the predetermined angle increases.

7. The display device according to claim 1, wherein each of the plurality of icons is composed of an icon body and a background portion, and the display control section generates the plurality of icons extended in the first direction by extending the icon body and the background portion of each of the plurality of icons so that a rate of extension of the icon body is greater than a rate of extension of the background portion.

8. The display device according to claim 1, wherein each of the plurality of icons is composed of an icon body and a background portion, the storage section previously stores, for each of the plurality of icons, a first image and a second image being composed by partly omitting the first image, the first image and the second image representing the icon body, and the display control section allows the display:

(2) when the acceptance section accepts through the touch panel the instruction of selecting to allow the plurality of icons to be displayed in the normal display manner, to display, by using a plurality of the first image previously stored in the storage section, the plurality of icons composed of the icon bodies represented by the first image, and (3) when the acceptance section accepts through the touch panel the instruction of selecting to allow the plurality of icons to be displayed in the different display manner, to display, by using a plurality of the second image previously stored in the storage section, the plurality of icons composed of the icon bodies represented by the second image.

9. The display device according to claim 1, wherein in extending the plurality of icons the display control section determines whether or not all of the extended plurality of icons fall within an operation screen and whether or not any of the extended plurality of icons overlaps with any of the icons adjacent thereto and, when any of the extended plurality of icons falls outside the operation screen or any of the extended plurality of icons overlaps with any of the adjacent icons, determines a specific number of the extended plurality of icons that can fall within the operation screen without overlapping with the adjacent icons and allows the display to display the operation screen in which the number of the extended plurality of icons contained within the operation screen is reduced to the specific number.

10. The display device according to claim 9, wherein the storage section further previously stores a degree of priority for each of the plurality of icons contained within the operation screen, the degree of priority indicating whether or not to contain the icon within the operation screen, and when any of the extended plurality of icons falls outside the operation screen or any of the extended plurality of icons overlaps with any of the adjacent icons, the display control section determines the plurality of icons to be contained within the operation screen based on the degrees of priority stored in the storage section.

11. The display device according to claim 1, wherein the display section is designed so that the tilt of the display surface of the display is variable about a pivot axis in one direction, and the first direction represents a direction orthogonal to an extending direction of the pivot axis on the display surface of the display and the second direction represents a direction same as the extending direction of the pivot axis on the display surface of the display.

12. The display device according to claim 1 further comprises an image forming section that forms an image on a paper sheet.

13. A non-transitory computer readable medium with a display control program recorded thereon, the display control program allowing a computer including a display section that includes a display and a touch panel, the display section being designed so that a tilt of a display surface of the display is variable, a storage section that previously stores a plurality of images each representing each of a plurality of icons of a same shape in which a ratio between a length in a predetermined first direction and a length in a second direction orthogonal to the first direction on the display surface of the display is predetermined, and a processor to function as: an acceptance section accepting an instruction to be input through the touch panel and a display control section controlling a display operation of the display, the display control program further allowing the computer to function so that the display control section allows the display:

(1) when the acceptance section accepts through the touch panel an instruction to display an acceptance screen for accepting an instruction of selecting to allow the plurality of icons to be displayed in a normal display manner or a different display manner different from the normal display manner, to display the acceptance screen;

(2) when the acceptance section accepts through the touch panel the instruction of selecting to allow the plurality of icons to be displayed in the normal display manner, to display, by using the plurality of images previously stored in the storage section, the plurality of icons whose lengths in the first direction and whose lengths in the second direction are not changed; and (3) when the acceptance section accepts through the touch panel the instruction of selecting to allow the plurality of icons to be displayed in the different display manner, to display, by using the plurality of images previously stored in the storage section, the plurality of icons of the same shape whose lengths in the first direction are extended equally and the lengths in the second direction are extended equally such that a degree of the extension increases as distance from one end of the display surface in the first direction decreases;

(4) when the acceptance section accepts through the touch panel the instruction of selecting to allow the plurality of icons to be displayed in the different display manner, the display control section additionally makes a display density of the plurality of icons higher than a display density of the plurality of icons represented by the plurality of images previously stored in the storage section.

14. A display device comprising:

a display section that includes a display and a touch panel, the display section being designed so that a tilt of a display surface of the display is variable;

a storage section that previously stores an image representing an operation screen containing a plurality of icons in which a ratio between a length in a predetermined first direction and a length in a second direction orthogonal to the first direction on the display surface of the display is predetermined;

a control unit that includes a processor and functions, when the processor executes a display control program, as an acceptance section accepting an instruction to be input through the touch panel, and as a display control section controlling a display operation of the display;

a tilt detecting section capable of detecting the tilt of the display surface, wherein as a difference between an angle of the tilt detected by the tilt detecting section and a predetermined angle increases, the display control section increases a dimension of the operation screen by which the operation screen is extended to the first direction; and the display control section allowing the display:

(1) when the acceptance section accepts through the touch panel an instruction to display an acceptance screen for accepting an instruction of selecting to allow the operation screen to be displayed in a normal display manner or a different display manner different from the normal display manner, to display the acceptance screen;

(2) when the acceptance section accepts through the touch panel the instruction of selecting to allow the operation screen to be displayed in the normal display manner, to display, by using the image previously stored in the storage section, a first operation screen in which a length in the first direction of the operation screen and a length in the second direction of the operation screen are not changed; and (3) when the acceptance section accepts through the touch panel the instruction of selecting to allow the operation screen to be displayed in the different display manner, to display, by using the image previously stored in the storage section, a second operation screen in which the length in the first direction of the operation screen is extended and the length in the second direction of the operation screen is extended such that a degree of the extension increases as distance from one end of the display surface in the first direction decreases.

15. The display device according to claim 14, wherein the display control section allows the display to display a screen in which a blank area generated in the display surface by image processing for reducing the second operation screen is complemented with the same color as a color constituting a background portion of the second operation screen.

16. The display device according to claim 14, wherein as the difference between the angle of the tilt detected by the tilt detecting section and the predetermined angle increases, the display control section increases the dimension by which the operation screen is extended to the second direction.

17. The display device according to claim 14, wherein the display section is designed so that the tilt of the display surface of the display is variable about a pivot axis in one direction, and the first direction represents a direction orthogonal to an extending direction of the pivot axis on the display surface of the display and the second direction represents a direction same as the extending direction of the pivot axis on the display surface of the display.

18. The display device according to claim 14 further comprises an image forming section that forms an image on a paper sheet.

* * * * *